United States Patent
Lund et al.

(10) Patent No.: US 7,630,301 B2
(45) Date of Patent: *Dec. 8, 2009

(54) METHOD AND APPARATUS FOR LINE AND PATH SELECTION WITHIN SONET/SDH BASED NETWORKS

(75) Inventors: Mats Lund, Novato, CA (US); Mingjun Zhang, Petaluma, CA (US); Jim Mao, Rohnert Park, CA (US)

(73) Assignee: Force10 Networks, Inc., San Jose, CA (US)

( * ) Notice: Subject to any disclaimer, the term of this patent is extended or adjusted under 35 U.S.C. 154(b) by 562 days.

This patent is subject to a terminal disclaimer.

(21) Appl. No.: 11/339,246

(22) Filed: Jan. 24, 2006

(65) Prior Publication Data

US 2006/0153069 A1    Jul. 13, 2006

Related U.S. Application Data

(63) Continuation of application No. 09/874,088, filed on Jun. 4, 2001, now Pat. No. 6,999,468.

(51) Int. Cl.
*H04J 3/14* (2006.01)
(52) U.S. Cl. ...................... 370/225; 370/537
(58) Field of Classification Search ......... 370/225–228, 370/537

See application file for complete search history.

(56) References Cited

U.S. PATENT DOCUMENTS

| 5,005,166 A | 4/1991 | Suzuki et al. |
|---|---|---|
| 5,065,314 A | 11/1991 | Maskovyak |
| 5,406,401 A | 4/1995 | Kremer |
| 5,428,806 A | 6/1995 | Pocrass |
| 5,457,556 A | 10/1995 | Shirgaki |
| 5,506,833 A | 4/1996 | Nemoto |
| 5,596,730 A | 1/1997 | Sekine |
| 5,615,237 A | 3/1997 | Chang et al. |
| 5,619,489 A | 4/1997 | Chang et al. |
| 5,721,727 A | 2/1998 | Ashi et al. |
| 5,724,352 A | 3/1998 | Cloonan et al. |
| 5,751,696 A | 5/1998 | Betchel et al. |
| 5,777,874 A | 7/1998 | Flood et al. |

(Continued)

FOREIGN PATENT DOCUMENTS

EP    0 620 694 A2    10/1994

(Continued)

OTHER PUBLICATIONS

Yuanyuan, Y., et al., "Nonblocking Broadcast Switching Networks", Sep. 1991, pp. 1005-1015, IEEE Transactions On Computers, vol. 40, No. 9.

(Continued)

*Primary Examiner*—Min Jung
(74) *Attorney, Agent, or Firm*—Blakely Sokoloff Taylor & Zafman LLP

(57) ABSTRACT

A line level selection unit is described that selects signals from a backplane. The line level selection unit has a clock that times egress time slots associated with an egress network line coupled to the egress channel. The egress channel has a primary protection group table that correlates the egress time slots to a protection group for each ingress signal used to fill the egress time slots. The protection group table has an output coupled to a channel select input of a first multiplexer. The first multiplexer has input values that reflect the status of each protection group for each ingress signal. The first multiplexer has an output coupled to a channel select input of a second multiplexer. The second multiplexer receives a plurality of inputs from a plurality of tables that indicate where an ingress signal may be found on the backplane.

21 Claims, 19 Drawing Sheets

U.S. PATENT DOCUMENTS

| | | |
|---|---|---|
| 5,793,745 A | 8/1998 | Manchester |
| 5,796,723 A | 8/1998 | Benchech et al. |
| 5,815,489 A | 9/1998 | Takatori et al. |
| 5,909,175 A | 6/1999 | Yamasaki et al. |
| 6,038,678 A | 3/2000 | Fukushima et al. |
| 6,101,198 A | 8/2000 | Koenig et al. |
| 6,205,562 B1 | 3/2001 | Fukushima et al. |
| 6,219,336 B1 * | 4/2001 | Takahashi et al. ........... 370/223 |
| 6,226,111 B1 | 5/2001 | Chang et al. |
| 6,229,814 B1 | 5/2001 | McMillian et al. |
| 6,278,536 B1 | 8/2001 | Kai et al. |
| 6,317,414 B1 | 11/2001 | Naohiro |
| 6,317,426 B1 * | 11/2001 | Afanador et al. ........... 370/352 |
| 6,317,439 B1 | 11/2001 | Cardona et al. |
| 6,351,452 B1 | 2/2002 | Koenig et al. |
| 6,359,859 B1 | 3/2002 | Brolin et al. |
| 6,606,667 B1 | 8/2003 | Hermann |
| 6,608,836 B2 | 8/2003 | Mao et al. |
| 6,647,428 B1 | 11/2003 | Bannai et al. |
| 6,718,480 B1 * | 4/2004 | Ogura et al. ................... 714/4 |
| 6,744,769 B1 | 6/2004 | Siu et al. |
| 7,050,391 B1 | 5/2006 | Mao |
| 7,173,936 B1 | 2/2007 | Semaan |
| 2006/0209905 A1 | 9/2006 | Mao |

FOREIGN PATENT DOCUMENTS

| | | |
|---|---|---|
| EP | 0 840 472 A2 | 5/1998 |
| WO | WO 98/31119 | 7/1998 |

OTHER PUBLICATIONS

Ohta, S., et al., "A Rearrangement Algorithm for Three-Stage Switching Networks", Sep. 1987, pp. 68-77, Electronics and Communications in Japan, Part 1, vol. 70, No. 9.

* cited by examiner

| STS1 EGRESS | APPLICABLE PROTECTION GROUP |
|---|---|
| 1 | PG0 |
| 2 | PG0 |
| 3 | PG0 |
| 4 | PG1 |
| 5 | PG1 |
| 6 | PG1 |
| 7 | PG2 |
| 8 | PG2 |
| 9 | PG2 |
| 10 | PG2 |
| 11 | PG2 |
| 12 | PG2 |
| ⋮ | |
| n | |

← PRIMARY PG TABLE 908a

FIG. 9A

| LINE STATUS | PG0 STAT A | PG1 STAT A | PG2 STAT A |
|---|---|---|---|
| W0, W1, W2a, W2b, "UP" | 1 | 1 | 1 |
| W1 "DOWN" | 1 | 2 | 1 |
| W2a "DOWN" | 1 | 1 | 3 |
| W2b "DOWN" | 1 | 1 | 4 |
| W1 "DOWN", W2a "DOWN" | 1 | 2 | 3 |
| W1 "DOWN", W2b "DOWN" | 1 | 2 | 4 |
| W1 "DOWN", W2a "DOWN", W2b "DOWN" | 1 | 2 | 3 |
| W2a "DOWN", W2b "DOWN" | 1 | 1 | 3 |
| ⋮ | | | |

FIG. 9B

| STS1 EGRESS | SELECTED INGRESS SIGNAL |
|---|---|
| 1 | W1_STS1_1 |
| 2 | W1_STS1_2 |
| 3 | W1_STS1_3 |
| 4 | W1_STS1_4 |
| 5 | W1_STS1_5 |
| 6 | W1_STS1_6 |
| 7 | W2_STS1_7 |
| 8 | W2_STS1_8 |
| 9 | W2_STS1_9 |
| 10 | W2_STS1_10 |
| 11 | W2_STS1_11 |
| 12 | W2_STS1_12 |
| ⋮ | ⋮ |
| n | |

W CC TABLE_1 1109a1

FIG. 11A

| STS1 EGRESS | SELECTED INGRESS SIGNAL |
|---|---|
| 1 | P2_STS1_1 |
| 2 | P2_STS1_2 |
| 3 | P2_STS1_3 |
| 4 | P2_STS1_4 |
| 5 | P2_STS1_5 |
| 6 | P2_STS1_6 |
| 7 | P1_STS1_7 |
| 8 | P1_STS1_8 |
| 9 | P1_STS1_9 |
| 10 | P1_STS1_10 |
| 11 | P1_STS1_11 |
| 12 | P1_STS1_12 |
| ⋮ | ⋮ |
| n | |

P CC TABLE_1 1109b1

FIG. 11B

| | ALL WORKING PATHS "UP" | W1_STS1_1 "DOWN" | W1_STS1_5 AND W_STS1_11 "DOWN" |
|---|---|---|---|
| STS1_SELECT_1 | W | P | W |
| STS1_SELECT_2 | W | W | W |
| STS1_SELECT_3 | W | W | W |
| STS1_SELECT_4 | W | W | W |
| STS1_SELECT_5 | W | W | P |
| STS1_SELECT_6 | W | W | W |
| STS1_SELECT_7 | W | W | W |
| STS1_SELECT_8 | W | W | W |
| STS1_SELECT_9 | W | W | W |
| STS1_SELECT_10 | W | W | W |
| STS1_SELECT_11 | W | W | P |
| STS1_SELECT_12 | W | W | W |
| ⋮ | | | |
| STS1_SELECT_n | W | W | W |

PATH STATUS

FIG. 12

| STS EGRESS | SELECTED INGRESS SIGNAL |
|---|---|
| 1 | W2a_STS1_W_1 |
| 2 | W2a_STS1_W_2 |
| 3 | W2a_STS1_W_3 |
| 4 | W2a_STS1_W_4 |
| ⋮ | ⋮ |
| n | W2a_STS1_W_n |

W_CC_TABLE_1
1409a1

FIG. 14A

| STS EGRESS | SELECTED INGRESS SIGNAL |
|---|---|
| 1 | W2a_STS1_P_1 |
| 2 | W2a_STS1_P_2 |
| 3 | W2a_STS1_P_3 |
| 4 | W2a_STS1_P_4 |
| ⋮ | ⋮ |
| n | W2a_STS1_P_n |

W_CC_TABLE_2
1409a2

FIG. 14B

| STS EGRESS | SELECTED INGRESS SIGNAL |
|---|---|
| 1 | W2b_STS1_W_1 |
| 2 | W2b_STS1_W_2 |
| 3 | W2b_STS1_W_3 |
| 4 | W2b_STS1_W_4 |
| ⋮ | ⋮ |
| n | W2b_STS1_W_n |

W_CC_TABLE_3
1409a3

FIG. 14C

| STS EGRESS | SELECTED INGRESS SIGNAL |
|---|---|
| 1 | W2b_STS1_P_1 |
| 2 | W2b_STS1_P_2 |
| 3 | W2b_STS1_P_3 |
| 4 | W2b_STS1_P_4 |
| ⋮ | ⋮ |
| n | W2b_STS1_P_n |

W_CC_TABLE_4
1409a4

FIG. 14D

METHOD AND APPARATUS FOR LINE AND PATH SELECTION WITHIN SONET/SDH BASED NETWORKS

CLAIM OF PRIORITY

This application is a continuation application and claims the priority date of U.S. patent application Ser. No. 09/874,088, filed Jun. 4, 2001, now U.S. Pat. No. 6,999,468 entitled, "Method And Apparatus For Line And Path Selection Within SONET/SDH Based Networks".

FIELD OF INVENTION

The field of invention relates generally to communication; and more specifically, to a method and apparatus for line and path selection within SONET/SDH based networks.

BACKGROUND

Protection Within SONET Networks

Synchronous Optical NETwork (SONET) and Synchronous Digital Hierarchy (SDH) based networks typically emphasize redundancy. That is for example, should a particular network line that couples a pair of networking systems (which may also be referred to as "nodes") within the network fail (or degrade), the network is designed to "switch over" to another network line so that traffic flow is not substantially interrupted. Various types of redundancy may be designed into a SONET network. Some examples are illustrated in the discussion that follows.

FIG. 1 shows a point-to-point perspective. Point to point redundancy focuses on the behavior of a pair of nodes 131, 132 that are coupled together by a plurality of SONET lines $104_1, 104_2, \ldots 104_{x-1}, 104_x$. Although other point-to-point schemes may be possible, common point-to-point schemes typically include 1+1 and 1:N. Both schemes classify a network line as either a working line or a protection line. A working line is deemed as the "active" line that carries the information transported by the network. A protection line serves as a "back-up" for a working line. That is, if a working line fails (or degrades), the protection line is used to carry the working line's traffic.

In a 1+1 scheme, both the working and protection lines simultaneously carry the same traffic. For example, referring to FIG. 1, if line $104_1$ is the working line and line $104_2$ is the protection line; the transmitting node 131 simultaneously transmits the same information on both the working line $104_1$ and the protection line $104_2$. The receiving node 132, during normal operation, "looks to" the working line $104_1$ for incoming traffic and ignores the incoming traffic on the protection line $104_2$. If a failure or degradation of the working line $104_1$ is detected, the receiving node 132 simply "looks to" the protection line $104_2$ for the incoming traffic (rather than the working line $104_1$).

In a 1:N scheme one protection line backs up N working lines (where N is an integer greater than or equal to 1). For example, referring to FIG. 1, lines $104_1$ through $104_{x-1}$ may be established as the working lines while line $104_x$ may be established as the protection line. If any of the working lines $104_1$ through $104_{x-1}$ fail or degrade, the transmitting node 131 sends the traffic of the failed/degraded working line over the protection line $104_x$. The receiving node 132 also "looks to" the protection line $104_x$ for the traffic that would have been sent over the failed/degraded working line prior to its failure/degradation.

FIG. 2 shows a ring perspective. Ring redundancy schemes focus on the behavior of a plurality of nodes 231 through 234 coupled together in a ring. Redundancy is commonly handled by sending identical streams of traffic in opposite directions. A first direction may be referred to as the working direction while a second direction may be referred to as the protection direction. The most commonly used types of ring protection are Unidirectional Path Switched Ring (UPSR) and Bi-directional Line Switched Ring (BLSR). In a two-fiber UPSR approach, working traffic is sent in a first direction around the ring (e.g., clockwise) and protection traffic is sent in a second direction around the ring (e.g., counter-clockwise).

In a Bi-directional Line Switched Ring (BLSR) approach, each pair of rings are viewed as comprising an "inner" ring and "outer" ring (although note that the rings' actual geographic coverage does not necessarily have to correspond to the inner ring always being within the outer ring). Typically, for each ring, half of the capacity is allocated for working traffic and the other half of the capacity is allocated for protection traffic. As such, both working traffic and protection traffic flow bi-directionally. In either the UPSR or BLSR approaches, if failure or degradation occurs in the working direction, active traffic is looked for in the protection direction.

More sophisticated SONET networks may also be designed that provide protection at higher degrees of resolution. That is, each SONET line (such as line $104_1$ of FIG. 1 or line 204 of FIG. 2) may be viewed as transporting a number of STS-1 signals. For example, if lines $104_1$ and 204 each correspond to an STS-n line, each of these lines may be viewed as carrying n STS-1 signals (e.g., an STS-48 line may be viewed as carrying 48 STS-1 signals). Furthermore, in other environments, each STS-1 signal is used as a resource for carrying a plurality of lower speed signals.

Protection may be provided for STS-1 signals individually or for their constituent lower speed signals individually. Either of these forms of protection are commonly referred to as "path protection". For example, in one type of 1+1 path protection scheme, an individual "working" STS-1 signal within an STS-n line (rather than all the STS-1 signals on the STS-n line) is backed up by a "protection" STS-1 signal transported on another STS-n line.

Automatic Protection Switching (APS) is a protocol that may be executed by the nodes within a SONET network. APS allows SONET nodes to communicate and organize the switching over from their working configuration to a protection configuration in light of a failure or degradation event (and then back again after the failure/degradation is corrected). For example, in a typical approach, K1 and K2 bytes are embedded within the SONET frame that is communicated between a pair of nodes in order to communicate failure/degradation events, requests for a switch over, correction thereafter, etc.

Distributed Switch Architecture

FIG. 3 shows an embodiment of a distributed "full mesh" node (or system) architecture 331. The architecture 331 of FIG. 3 may be utilized to implement a SONET node such as nodes 131, 132 of FIG. 1 or nodes 231 through 234 of FIG. 2. An ingress channel receives incoming data from a networking line. FIG. 3 shows ingress channels $301_1$ through $301_x$ that each receive incoming data on a respective network line $303_1$ through $303_x$.

An egress channel transmits outgoing data onto a networking line. FIG. 3 shows egress channels $312_1$ through $312_x$ that each transmit outgoing data on a respective network line $304_1$ through $304_x$. In a full mesh architecture embodiment, each ingress channel $301_1$ through $301_x$ transmits all of its ingress traffic to each egress channel $312_1$ through $312_x$. For example, referring to FIG. 3, ingress channel $301_1$ receives n STS-1 signals from its corresponding network line $303_1$ (e.g., if network line $303_1$ is an OC-48 line; n=48 and the ingress line channel receives 48 STS-1 signals).

All n of the STS-1 signals received by the ingress channel $301_1$ are transmitted across the node's backplane 305 over each of its output lines 306, 310, 311, 312. A backplane is a board (e.g., a PC or "planar" board) having signal lines that electrically couple various line cards together. Typically, individual cards "plug into" a backplane 305 (e.g., via a card connector) and; in so doing, become communicatively coupled with one another. As such, plugging a sufficient type and quantity of cards into a backplane results in the formation of a networking system. Frequently (although not a strict requirement), backplanes have little or no sophisticated circuitry (e.g., processors, Application Specific Integrated Circuits (ASICs), etc.) and are substantially a collection of "short circuits" from card to card (although passive devices (e.g., capacitors, resistors, etc.), line drivers and other signal enhancing chips or devices are often found on a typical backplane).

Continuing with the discussion of the full mesh embodiment of FIG. 3, note that each egress channel $312_1$ through $312_x$ receives all n STS-1 signals received by ingress channel $303_1$. In one approach, each STS-1 signal is provided its own signal line to each egress channel. As a result, each output 306, 310, 311, 312 corresponds to a n-wide bus. As each ingress channel is similarly designed, each egress channel $312_1$ through $312_x$ receives all the incoming traffic received by the node. For example, in the particular example of FIG. 3, there are x ingress channels $301_1$ through $301_x$ that each receive n STS-1 signal. As such, each egress channel $312_1$ through $312_x$ receives xn STS-1 signals (which correspond to the total amount of traffic received by the node 331).

For example, note that egress channel $312_1$ receives inputs $306_1$ through $306_x$ where each of these inputs correspond to the n STS-1 signals received by their corresponding ingress channel (i.e., input 306 for ingress channel $301_1$, input 307 for ingress channel $301_2$, input 308 for ingress channel $301_3$, . . . and input 309 for ingress channel $301_x$). In order to implement the switching fabric of the node, each egress channel $312_1$ through $312_x$ is configured to select n of the xn STS-1 signals and transmit the n STS-1 signals over its corresponding outgoing networking line $304_1$ through $304_x$.

Note that there is a distinction between a line card and a channel. A line card is a card that can be coupled to one or more network lines. A channel is a data path within a line card that handles traffic flow in a particular direction (e.g., ingress or egress). As such, a line card having both ingress and egress connectivity will have both an ingress channel and an egress channel. Thus, for example, the ingress channel $301_1$ and the egress channel $312_1$ may coexist upon the same line card.

In other distributed switch architecture embodiments, each ingress channel $301_1$ through $301_x$ transmits less than all of its ingress traffic to each egress channel $312_1$ through $312_x$. For example, referring again to FIG. 3, if ingress channel $301_1$ receives n STS-1 signals from its corresponding network line $303_1$—less than all n of the STS-1 signals received by the ingress channel $301_1$ are transmitted across the node's backplane 305 over each of its output lines 306, 310, 311, . . . 312.

This reduced amount of backplane 305 traffic (as compared to the "full mesh" approach described above) may be achieved by designing some degree of switching intelligence into the ingress channels $301_1$ through $301_x$ themselves. As a result, each ingress channel $301_1$ through $301_x$ transmits a subset of all n of the STS-1 signals it receives. Note that the actual electrical signal lines used to transport STS-1 signals across the backplane 305 may also vary from embodiment (regardless of the backplane is a full mesh backplane or is less than a full mesh backplane). For example, in one approach STS-1 signals from the same frame may be transported in parallel (e.g., as suggested by FIG. 3) or in series (e.g., STS-1 signals from the same frame are transported in a time division multiplexed fashion)

BRIEF DESCRIPTION OF THE DRAWINGS

The present invention is illustrated by way of example, and not limitation, in the Figures of the accompanying drawings in which:

FIG. 9a shows a protection group table that may be used to implement the protection configuration that is discussed with respect to FIGS. 7 through 8b.

FIG. 9b shows a configuration strategy for determining the appropriate second multiplexer channel select value of FIG. 5.

FIGS. 11a and 11b show embodiments of a primary normal operation table and secondary normal operation table.

FIG. 12 shows various configurations for the path level selection unit 602 embodiment of FIG. 6 in response to various STS1 signal conditions associated with exemplary configuration of FIG. 10a and FIGS. 11a and 11b.

FIG. 14a through 14d show tables that may be used for the 1:n protection scheme depicted in FIG. 13.

DETAILED DESCRIPTION 1.0 Overview

Figure 1:
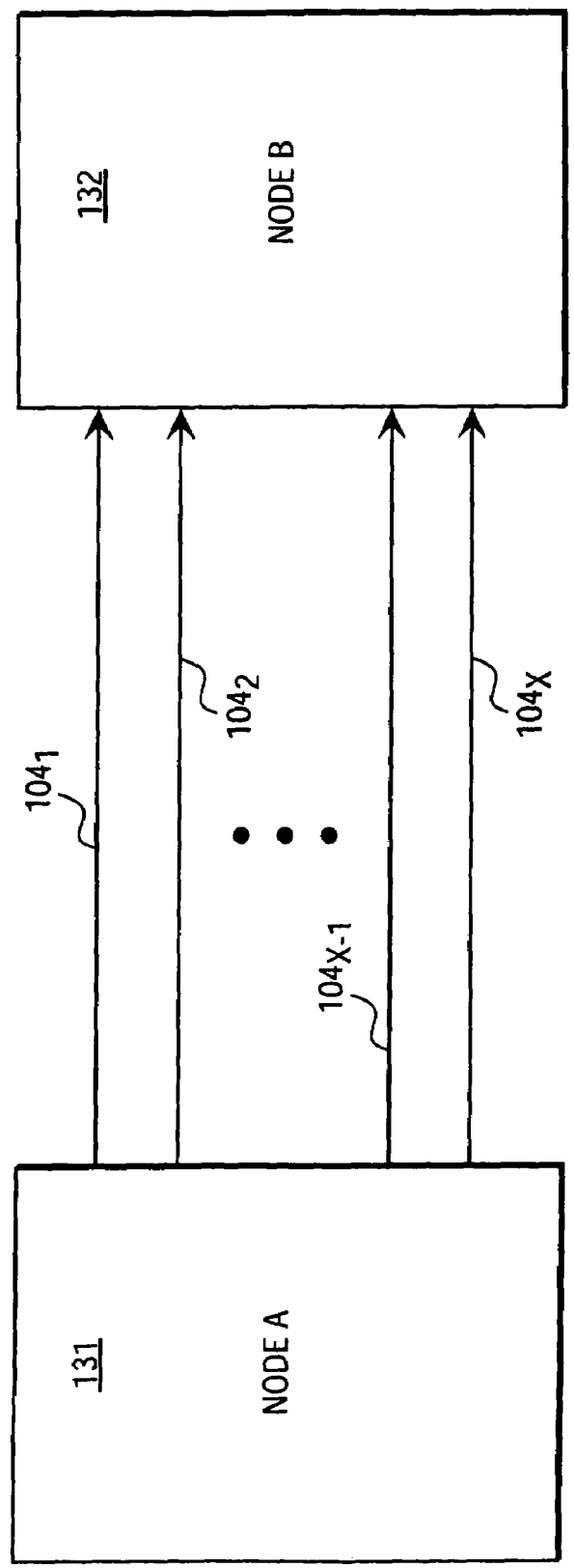
FIG. 1 shows a point to point SONET networking perspective.
Figure 2:
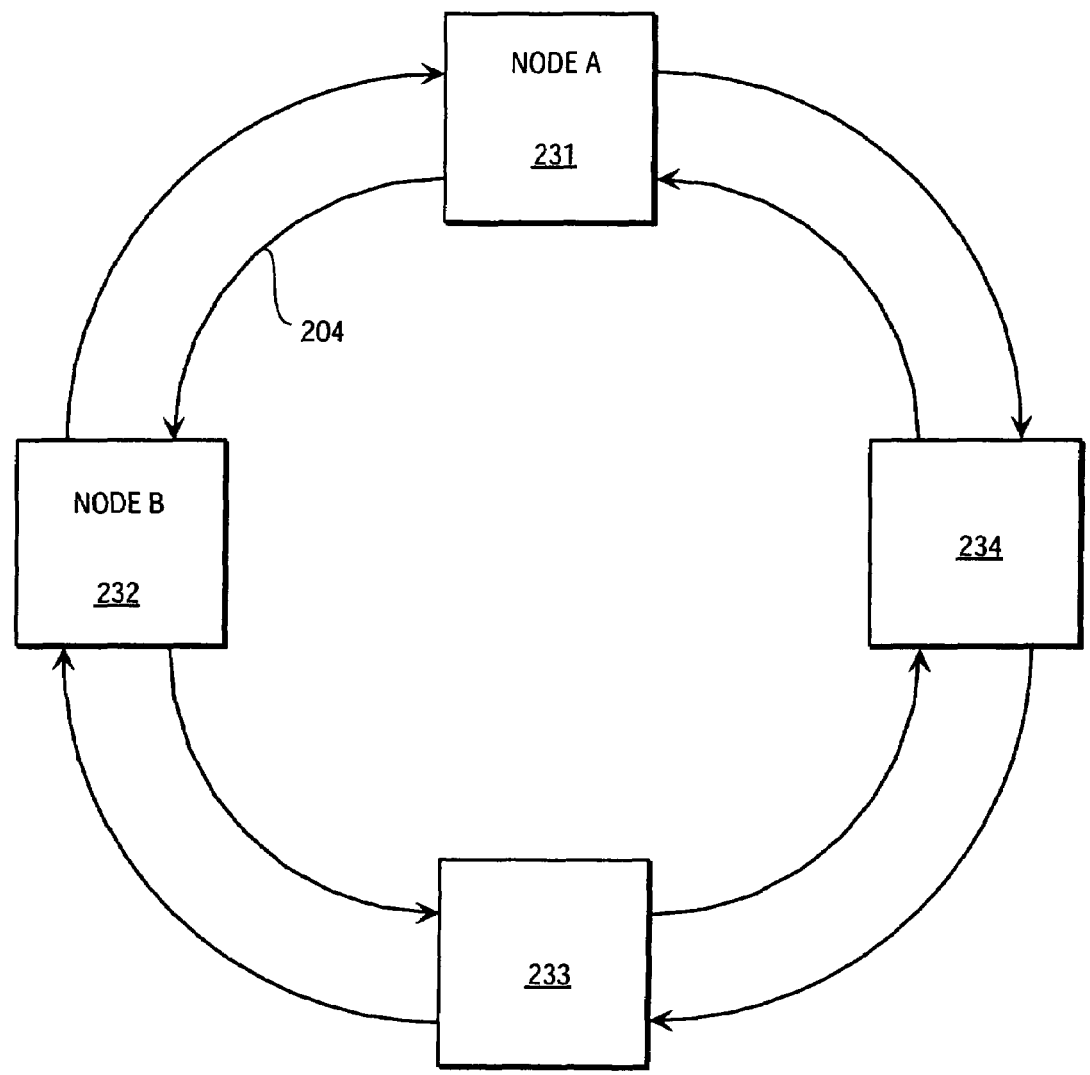
FIG. 2 shows a ring SONET networking perspective.
Figure 3:
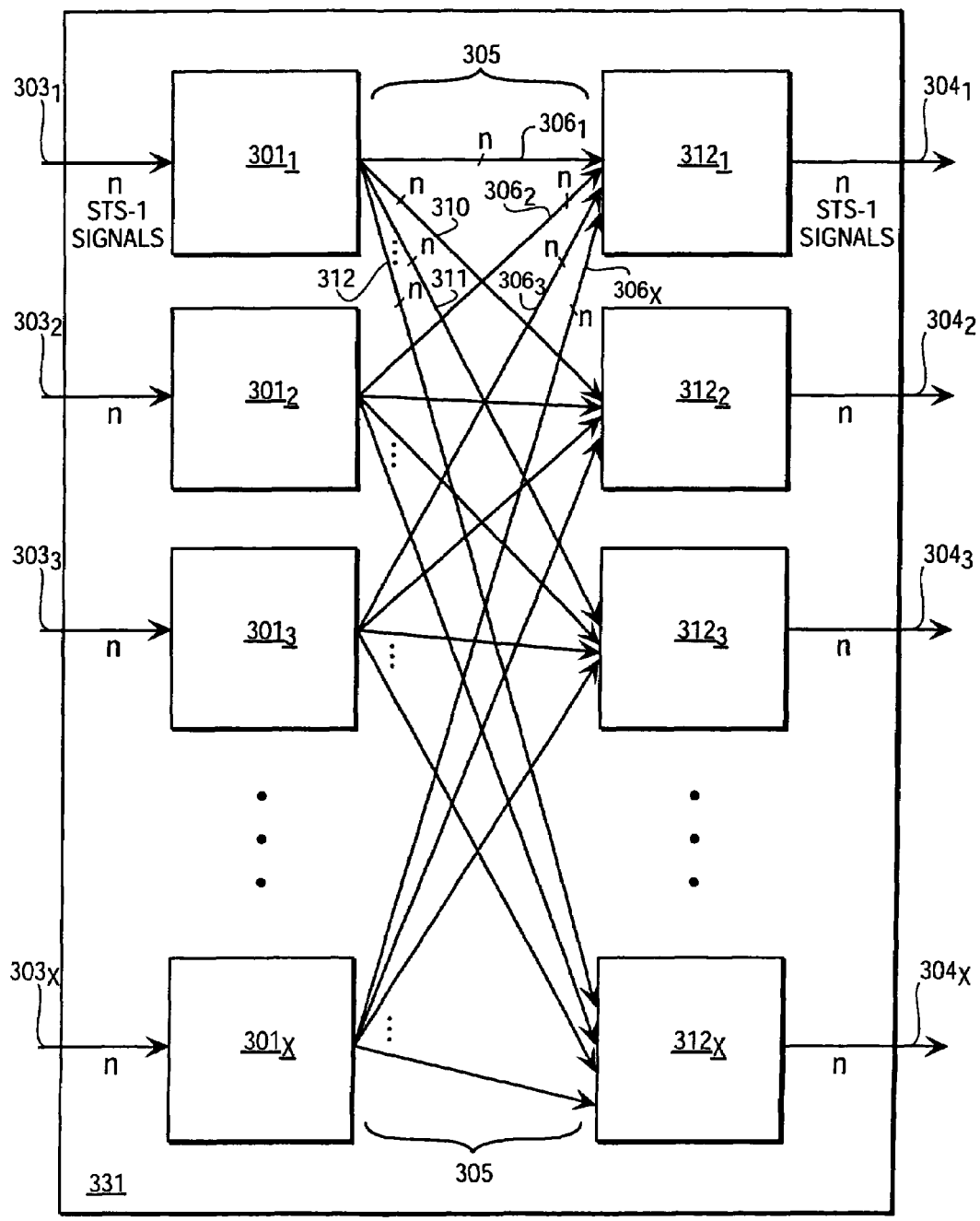
FIG. 3 shows a full mesh distributed switch architecture.
Figure 4:
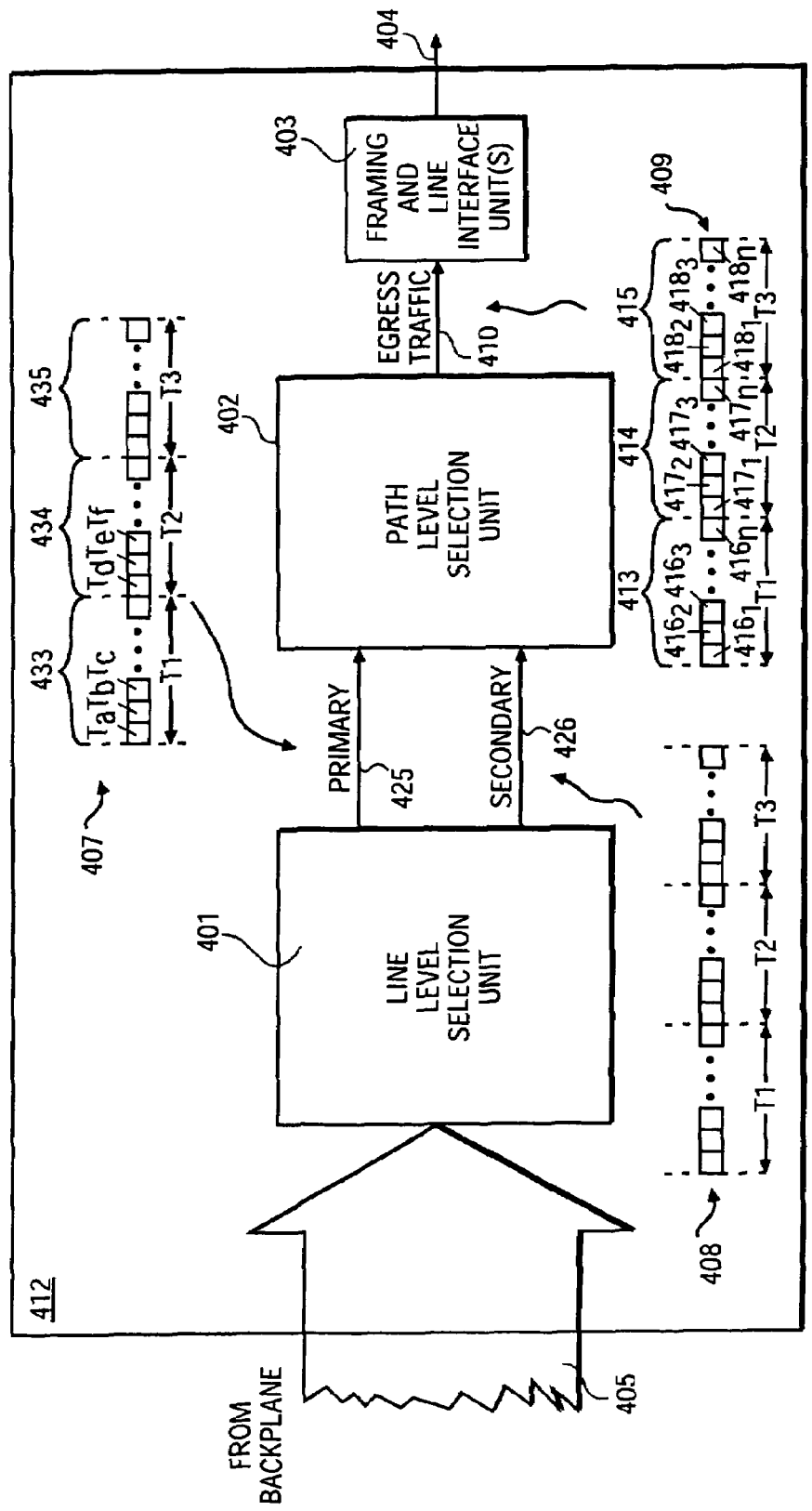
FIG. 4 shows an embodiment of an egress channel.

A SONET node architecture that supports a wide selection of different redundancy schemes provides customers with a wide variety of protection options. FIG. 4 shows an embodiment 412 of an egress channel that at least supports 1+1, 1:N, UPSR and BLSR based redundancy schemes. The egress channel 412 of FIG. 4 may be used within the full mesh distributed switch architecture (or less than a full mesh architecture) as described in the background. For example, within a full mesh backplane system, egress channel 412 of FIG. 4 may correspond to any of the egress channels $312_1$ through $312_x$ observed in FIG. 3.

The egress channel 412 of FIG. 4 transmits outgoing data onto egress networking line 404. The outgoing data may also be referred to as egress traffic 409. The egress traffic 409 is presented to a framing and line interface unit 403 (at the input 410 to the framing and line interface unit 403). In an embodiment, the framing and line interface unit 403 formats the egress traffic 409 into a SONET frame and transmits it over egress networking line 404. A frame, as known in the art, is the organization of the flow of information that exists upon a network line.

In the case of SONET frames, traditionally, each frame may be viewed as carrying "n" synchronous payload envelopes (SPEs) of 810 bytes. Therefore, as seen in FIG. 4, the egress traffic 409 provided to the framing and line interface unit 403 may be viewed as a time division multiplexed (TDM) structure that carries n SPEs for each frame unit. For example, as seen in FIG. 4, egress traffic 409 includes: 1) SPEs $416_1$, $416_2$, $416_3$, ..., $416_n$ within a first frame unit 413; 2) SPEs $417_1$, $417_2$, $417_3$, ..., $417_n$ within a second frame unit 414; 3) SPEs $418_1$, $418_2$, $418_3$, ..., $418_n$ within a third frame 415 unit, etc.

The framing performed by the framing and line interface unit 403 effectively maps the structure of the egress traffic 409 into a SONET frame. As such, for example, the first frame unit 413 corresponds to a first SONET frame that is transmitted on networking line 404, the second frame unit 414 corresponds to a second SONET frame that is transmitted on networking line 404, the third frame unit 415 corresponds to a third SONET frame that is transmitted on networking line 404, etc.

For SONET frame transmission, in an embodiment, the time consumed by each frame unit within the egress traffic 409 (e.g., time T1 for frame unit 413, time T2 for frame unit 414, and time T3 for frame unit 415) corresponds to 125 us regardless of the number of SPEs carried per frame unit (i.e., "n"). Furthermore, the number of SPEs carried per frame unit may remain constant from frame unit to frame unit. Thus, the number of SPEs carried per frame unit is indicative of the network line speed.

For example, egress traffic 409 having only one SPE per frame unit (i.e., n=1) corresponds to a SONET line speed of 51.840 Mbs (i.e., 810 bytes every 125 us). Similarly, egress traffic 409 having three SPEs per frame unit (i.e., n=3) corresponds to a SONET line speed of 155.52 Mbs (i.e., 2430 bytes every 125 us), egress traffic 409 having forty eight SPEs per frame unit (i.e., n=48) corresponds to a SONET line speed of 2.488 Gb/s (i.e., 38880 bytes every 125 us), etc. Note that if the applicable networking line is optical "OC" is typically used instead of "STS" (e.g., OC-3, OC-48, etc.).

One SPE per 125 us is referred to as an STS-1 signal. Thus, a 51.840 Mbs SONET networking line carries a single STS-1 signal; a 155.52 Mbs SONET networking line carries three STS-1 signals; and a 2.488 Gb/s SONET networking line carries forty eight STS-1 signals. Typically, each STS-1 signal may be viewed as corresponding to the same SPE position across different frame units. That is, a first STS-1 signal corresponds to SPEs $416_1$, $417_1$, and $418_1$; a second STS-1 signal corresponds to SPEs $416_2$, $417_2$, $418_2$; etc. Another type of frame, referred to as SDH frames use STM-1 signals rather than STS-1 signals. The framing associated with the framing and line interface unit 403 may be SONET, SDH and others.

Note that the discussion of the egress traffic 409 provided above may be viewed as being more conceptual that structural. That is, the actual structure of the flow of egress data that is provided to the framing and line interface unit 403 may differ from the TDM structure 409 observed in FIG. 4. For example, as one alternate approach, information for each egress STS-1 signal is loaded "in parallel" into the framing and line interface unit 403.

Also, the framing and line interface unit 403 may include an optic or electrical transmitter depending on whether the outbound network line 404 is an optical or electrical cable. Note that the outbound network line 404 may be implemented with a plurality of outbound network lines in a "striped" fashion. For example, an OC-48 outbound network line 404 may actually be implemented with four OC-12 outbound network lines. Thus, in various embodiments, the framing and line interface unit 403 may be designed to distribute the traffic from the backplane over a plurality of outbound networking lines.

In the egress channel architecture 412 of FIG. 4, the egress traffic 409 is provided by a path level selection unit 402. The path level selection unit 402, as described in more detail below, "puts together" the stream of egress traffic 409 as well as implements "path level" protection for those STS-1 signals that were originally received (at an ingress channel) as path protected signals. Note that, each ingress STS-1 signal that is protected at the "path level" (or, in other words, was received with "path protection" or "path level protection" or is "path protected"), may be viewed as having a two sources: a working STS-1 signal and a protection STS-1 signal. These separate sources are typically associated with different ingress lines Accordingly, for those STS-1 signals being emitted as egress traffic 409 (that were received as "path protected" ingress STS-1 signals), the working STS-1 signals are provided at the primary input 425 and the protection STS-1 signals are provided at the secondary input 426. In an embodiment, for each "path protected" ingress STS-1 signal, the path level selection unit 402 is designed to incorporate (e.g., "select") the working STS-1 signal (at primary input 425) as egress traffic 409 unless the working STS-1 signal fails (e.g., "disappears") or degrades.

If the working STS-1 signal fails or degrades (for a path protected ingress STS-1 signal), the path level selection unit 402 "switches over" to the secondary input 426 as the new source for that STS-1 signal. As a result, the egress traffic 409 will be formed with the protection STS-1 signal from secondary input 426 (in replace of the failed or degraded working STS-1 signal). In this manner, path level protection is built into the switch fabric of the node. That is, the failure of a (working) path protected ingress STS-1 signal is transparent to the egress traffic 409 because the path level selection unit 402 can replace the failed signal with its protection (i.e., replacement) signal located at the primary input 426.

For those ingress STS-1 signals that were not received with path level protection, the path level selection unit 402 simply looks to the primary input 425 as the sole source for these signals. That is, STS-1 signals that were not received with path protection may be viewed (at the path level) as having only one source (which corresponds to primary input 425). As such, for any node configuration (and regardless as to which, if any, STS-1 signals were received with path level protection), the primary source for the egress traffic 409 is presented at primary input 425.

Thus, during the normal or nominal operating mode (were no failure or degradations have occurred), the path level selection unit 402 simply "repeats" the primary, working traffic 407 (i.e., the data stream 407 provided at the primary input 425) at its output in order to form the egress traffic 409. For those STS-1 signals in the egress traffic 409 that were received with path level protection, a duplicate set of STS-1 signals are provided at the secondary input 426 (which corresponds to secondary, protection traffic 408).

An STS-1 signal from the secondary traffic 408 will be chosen for the egress traffic 409 if its working counterpart in the primary, working traffic 407 begins to fail or degrade. Note that, unless all the STS-1 signals within the egress traffic 409 were originally received with path level protection, the secondary, protection data stream 408 should correspond to less total traffic than the primary, working data stream 407. Note also that, again, that the actual structure of the primary and secondary data streams that are provided to the path level selection unit 402 may differ from the TDM structures 408, 407 observed in FIG. 4. For example, as one alternate approach, each stream may be loaded "in parallel" into the path level selection unit 403.

In light of the discussion above, the line level selection unit 401 is responsible for forming the primary data stream 407 and the secondary data stream 408 as well as implementing line level protection for those ingress STS-1 signals that were received on a protected ingress network line. As such, those STS-1 signals that were received on a protected ingress network line will be unaffected (as observed at either the primary or secondary outputs 425, 426 of the line level selection unit 401) if their working network line fails because the line level selection unit 401 will be able to "switch over" so as to recognize each applicable protection line as the new source for these signals.

2.0 Line Level Protection

The line level selection unit 401 selects the appropriate ingress STS-1 signals for the primary and secondary data streams 407, 408 from the backplane 405. As discussed, the backplane 405 can correspond to a full mesh backplane (or less than a full mesh backplane) as described in the background. In any case, in a distributed approach, it is typical that more ingress STS-1 signals than those needed to generate the primary and secondary data streams 407, 408 are received by the line level selection unit 401 (from the backplane 405).

Figure 5:
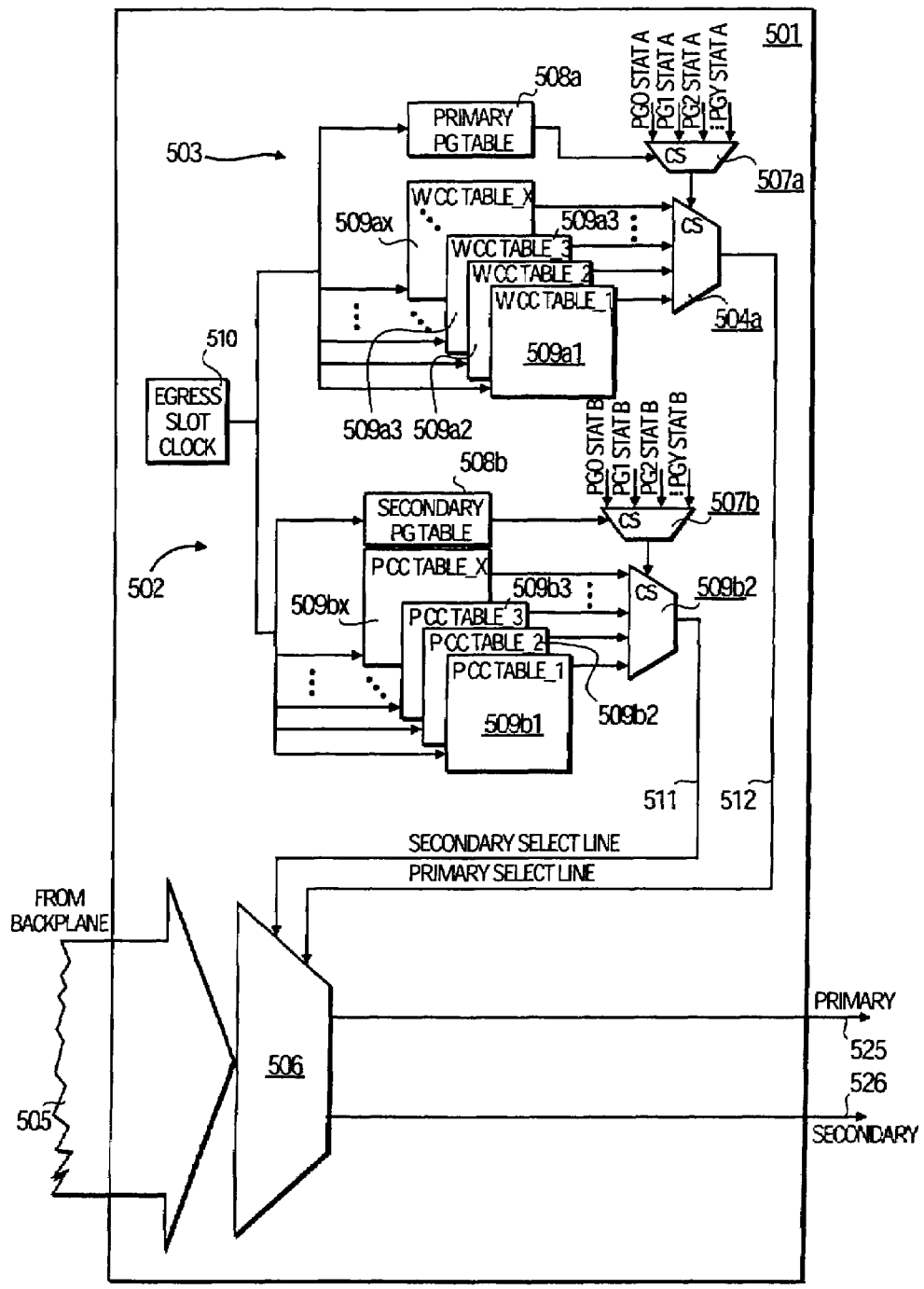
FIG. 5 shows an embodiment of a line level selection unit that may be used for the line level selection unit of FIG. 4.

As such, the line level selection unit 401 "selects" an appropriate subset of the ingress STS-1 signals it receives from the backplane 405 in order to generate the primary and secondary data streams 407, 408, which, in turn, corresponds to a portion of the overall system's switching fabric being implemented by the egress channel 412. FIG. 5 shows an embodiment of line selection unit 501 that may be used for the line selection unit 401 of FIG. 4. FIG. 5 will be used to support a discussion (that follows immediately below) of line level protection, as well as the generation of the primary and secondary data streams 407, 408.

Referring to FIGS. 4 and 5, ingress STS-1 signals that that are used to form the primary data stream 407 are specified by the primary select line 512 and ingress STS-1 signals that that are used to form the secondary data stream 407 are specified by the secondary select line 511. In response to the specifications respectively provided by the select lines 511, 512, a stream of selected signals are presented at the primary traffic output 525 (which provides the primary data stream) and a stream of selected signals are presented at the secondary traffic output 526.

In the embodiment of FIG. 5, time division multiplexed (TDM) streams of primary and secondary traffic can be serially issued (as observed in streams 407, 408 of FIG. 4) at their respective outputs 525, 526. If the primary and secondary select lines 512, 511 indicate each ingress STS-1 signal to be selected by cyclically referring to each ingress STS-1 signal, a TDM stream may be created where each cycle corresponds to a different frame unit.

For example, referring to FIGS. 4 and 5, each of the ingress STS-1 signals that may be used for a primary STS-1 signal are individually referred to by the secondary select line 511 over the span of time T1. That is, referring to FIG. 4, the first ingress STS-1 signal is referred to at time Ta, the second ingress STS-1 signal is referred to at time Tb, the third ingress STS-1 signal is referred to at time Tc, etc. When the last ingress STS-1 signal has been referred to, the cycle repeats over the span of time T2.

That is, the aforementioned first ingress STS-1 signal is next referred to at time Td, the aforementioned second ingress STS-1 signal is next referred to at time Te, the aforementioned third ingress STS-1 signal is next referred to at time Tf, etc. As such, a TDM stream of primary traffic 407 is naturally formed. A TDM stream of secondary traffic 408 may be naturally formed in a similar manner. However, as alluded to above, note that the secondary stream will not be filled (i.e., STS-1 signals will be missing from various time slots) unless each STS-1 signal in the primary stream 407 is path level protected.

In the embodiment of FIG. 5, the egress slot clock 510 times the frequency at which backplane references are made on the primary select line 512 and the secondary select line 511. For example, referring to FIG. 4, the egress slot clock 510 may "tick" for each ingress STS-1 signal to be extracted from the backplane 505 (e.g., at times Ta, Tb, Tc, . . . , etc. as seen in FIG. 4). The temporal position of each ingress STS-1 reference may be referred to as an egress time slot (or simply, a time slot or slot). Thus, time Ta corresponds to a first time slot, time Tb corresponds to a second time slot, time Tc corresponds to third time slot, etc.

In the embodiment of FIG. 5, the egress slot clock 510 times the rate at which a series of look-up operations are performed in order to provide the appropriate stream of ingress STS-1 signal references on the primary select line 512 and the secondary select line 511. In the embodiment of FIG. 5, an ingress STS-1 signal is referenced by looking up a pointer to a particular cross connect table where the reference to the ingress STS-1 signal is found. A cross connect table may be implemented with a memory, register or other data storage device or element.

Figure 6:
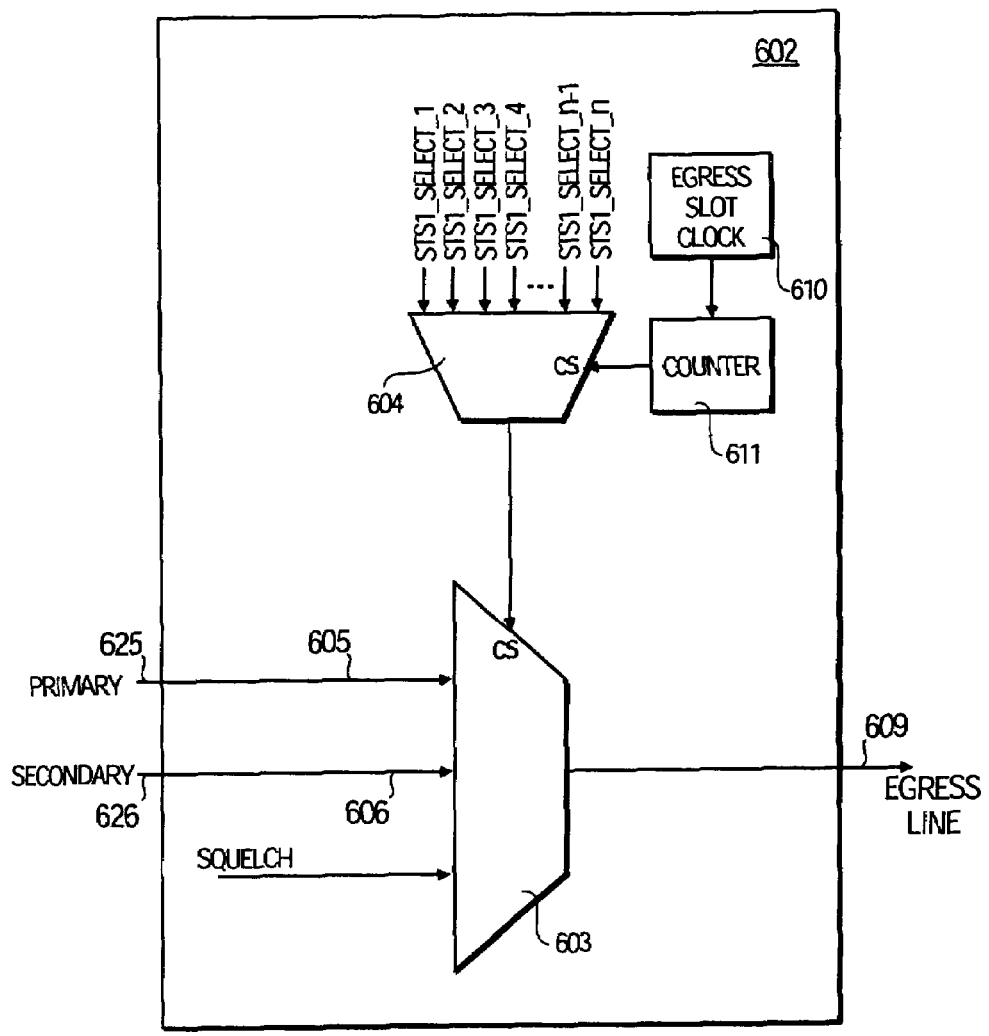
FIG. 6 shows an embodiment of a path level selection unit that may be used for the path level selection unit of FIG. 4.
Figure 7:
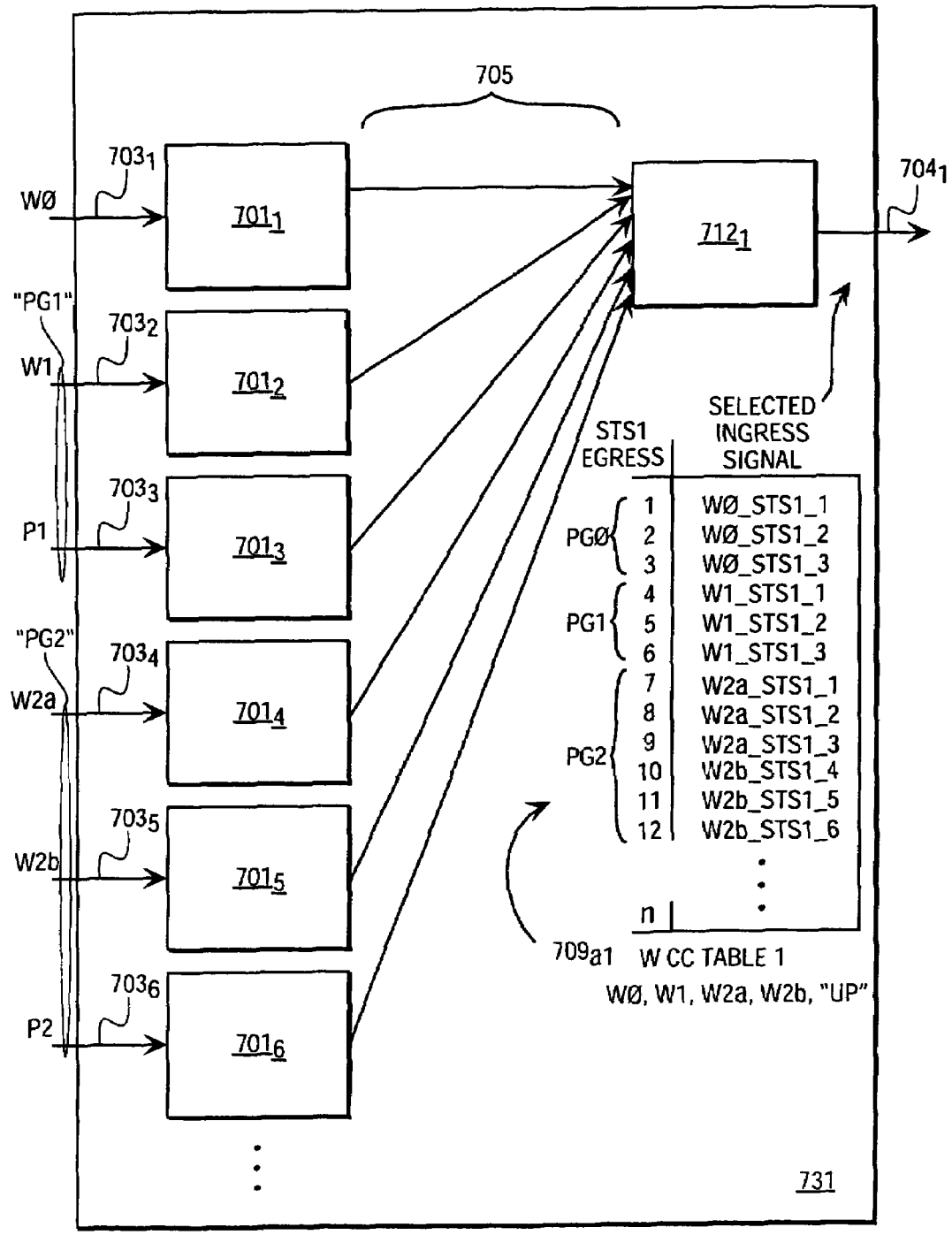
FIG. 7 shows an exemplary embodiment of a configuration for a node that receives information having line level protection.

FIG. 7 may be used to support an example of such a process (noting that FIG. 6 represents an embodiment of the path level selection unit 402 which will be discussed in more detail further below). FIG. 7 shows an exemplary embodiment of a node 731 having line level protection. According to the example of FIG. 7, egress channel $712_1$ corresponds to an egress channel that transmits a collection of STS-1 signals that were originally received as egress STS-1 signals on ingress channels $701_1$ through $701_6$.

That is, as shown in W CC Table 1 709a1 of FIG. 7, the egress traffic of egress channel $712_1$ (which corresponds to a portion of the egress traffic 409 of FIG. 4) is organized according to the following strategy during normal operating conditions:

1) the first three ingress STS-1 signals that are received at ingress channel $701_1$ upon the "W0" ingress networking line $703_1$ (i.e., ingress signals: W0_STS1_1, W0_STS1_2, and W0_STS1_3) are transmitted by the egress channel $712_1$ as the first three egress STS-1 signals upon egress networking line $704_1$ (i.e., STS1 egress signals: 1, 2 and 3);

2) the first three ingress STS-1 signals that are received at ingress channel $701_2$ upon the "W1" ingress networking line $703_2$ (i.e., ingress signals: W1_STS1_1, W1_STS1_2, and W1_STS1_3) are transmitted by the egress channel $712_1$ as the fourth, fifth and sixth egress STS-1 signals upon egress networking line $704_1$ (i.e., STS1 egress signals: 4, 5 and 6);

3) the first three ingress STS-1 signals that are received at ingress channel $701_4$ upon the "W2a" ingress networking line $703_4$ (i.e., ingress signals: W2a_STS1_1, W2a_STS1_2, and W2a_STS1_3) are transmitted by the egress channel $712_1$ as the seventh, eight and ninth egress STS-1 signals upon egress networking line $704_1$ (i.e., STS1 egress signals: 7, 8 and 9); and 4) the fourth, fifth and sixth ingress STS-1 signals that are received at ingress channel $701_5$ upon the "W2b" ingress networking line $703_5$ (i.e., ingress signals: W2b_STS1_4, W2b_STS1_5, and W2b_STS1_6) are transmitted by the egress channel $712_1$ as the tenth, eleventh and twelfth egress STS-1 signals upon egress networking line $704_1$ (i.e., STS1 egress signals: 10, 11 and 12)

Note that the above described exemplary configuration may be viewed as just a portion of the overall configuration for egress channel $712_1$ and node 731. That is, if egress networking line $704_1$ corresponds to an OC-48 line, the egress line $704_1$ can support the transmission of 36 more egress STS-1 signals. Likewise, the node 731 can support more ingress channels and egress channels than those depicted in FIG. 7. Further still, note that the egress channel $712_1$ may receive more STS-1 signals from the backplane 705 than those employed as egress traffic from egress channel $712_1$. As such, the switching fabric of the node is constructed in a distributed fashion where each egress channel plays a role in the selection of the ingress STS-1 signals that it will subsequently transmit as egress traffic.

Note that different types of redundancy are built into the exemplary nodal configuration of FIG. 7. That is, ingress line W0 $703_1$ is an "unprotected" line, ingress line W1 $703_2$ is a working line that is protected, in a 1+1 fashion, by protection line P1 $703_3$; and, ingress lines W2a $703_4$ and W2b $703_5$ are both protected, in 1:2 fashion (i.e., a 1:n fashion where n=2), by protection line P2 $703_6$. During "normal" operation the working ingress lines W0 $703_1$, W1 $703_2$, W2a $703_4$ and W2b $703_5$ are each operating properly (i.e., all are "up") and the STS-1 signal selection performed by the egress channel $712_1$ corresponds to that reflected (and just discussed) within W CC Table 1 709a1.

Referring now to FIGS. 5 and 7, note that the contents of the W CC Table 1 709a1 of FIG. 7 (or similarly organized information) may be stored within the W CC Table_1 509a1 of FIG. 5. During normal operation (where each ingress working line W0, W1, W2a and W2b is "up") the contents of W CC Table_1 509a1 (which may be referred to as the "normal operating" table) are used as a resource for "looking up" the appropriate STS-1 signal references that are generated on the primary select line 511. Looking up is a process in which a first, input variable (e.g., as represented in the left hand column of table 709a1 of FIG. 7) is used to generate a second, output variable (e.g., as represented in the right hand column of table 709a1 of FIG. 7).

Thus, if the left hand column of the normal operating table 509a1, 709a1 corresponds to each individual egress STS-1 signal time slot and the right hand column of the normal operating table 509a1, 709a1 corresponds to a reference as to where the indicated ingress STS-1 signal can be found on the backplane 505, with each next tick of the egress slot clock 510, a reading from the next entry in the table 509a1, 709a1 is performed. As a result of the looking up process, the proper stream of ingress STS-1 signal references will be generated on the primary select line 512.

For example, if the current time slot corresponds to the first egress time slot (i.e., the "1" entry in the left hand column of the normal operating table 509a1, 709a1 a value of "W0_STS1_1" will be read from the normal operating table 509a1, 709a1 and provided at the output 512 of the second multiplexer 504a. As a result (viewing the right hand entries of the table 709a1 as a backplane reference to the indicated STS-1 signal), the first STS-1 signal from the W0 working line $703_1$ will be selected from the backplane 505 (by the backplane selection unit 506) and presented at primary output 525 (which corresponds to primary line 425 of FIG. 4).

Upon the next clock egress slot clock 510 "tick", the next entry in the normal operating table 509a1, 709a1 is looked up (i.e., time slot #2 which produces a reference to the W0_STS1_2 ingress signal upon the primary select line 512) which results in the W0_STS1_2 ingress signal being presented at the primary output 525. In this manner, by moving to the next entry in the main operating table 509a1, 709a1 a continuous stream of the appropriate primary STS-1 signals will be presented at the primary output 525. After reaching the "nth" egress slot clock tick, the next egress slot clock tick simply rolls over back to the first table entry.

Looking up is the act of retrieving stored information. Looking up may be performed in any of number of ways that are known in the art including (but not limited to) those techniques that employ custom semiconductor logic (e.g., with an ASIC chip) that controls the look-up procedure from a semiconductor memory chip or memory region of a semiconductor chip (or register space, etc.); or a general purpose processor that executes software configured to perform the lookups from memory coupled to the processor. Looking up from a memory chip or memory region may be performed by addressing the appropriate memory location during a read operation so as to observe the memory contents at the indicated address.

Before continuing, note that the backplane may be designed to correlate each ingress STS-1 signal with the particular line card and SONET frame location it arrived on. Hence, the format for the description of the output contents of the W CC table 709a2 of FIG. 7 (e.g., which reference a particular location on the backplane 505) may have an express or implicit reference to the particular line card, ingress network line and time slot thereon that the ingress signal arrived upon.

Thus, to review thus far, during normal operation (when each of the working ingress lines are "up"), the normal operating table 509a1, 709a1 is used to generate the appropriate STS-1 signal references on the primary select line 512. As such, the second multiplexer 504a channel select value (which is provided by the first multiplexer 507a) enables the output of the normal operating table 509a1, 709a1 throughout the lookup process during normal operational mode.

Referring now to FIG. 7, recall that ingress line W0 $703_1$ is an "unprotected" line, ingress line W1 $703_2$ is a working line that is protected, in a 1+1 fashion, by protection line P1 $703_3$; and, ingress lines W2a $703_4$ and W2b $703_5$ are both protected, in 1:2 fashion (i.e., a 1:n fashion where n=2), by protection line P2 $703_6$. Should, any of the working ingress lines begin to fail or degrade, the egress channel $712_1$ will react so as to "switch over" to recognition of its protection line (if one exists) as the source for the appropriate STS-1 signals.

For example, should working line W1 $703_2$ fail or degrade (i.e. go "down"), protection line P1 $703_3$ will be recognized as the new source for the ingress STS-1 signals that are to be transmitted along egress network line $704_1$ as egress STS-1 signals in time slots 4, 5 and 6. In a sense then, it may be said that the protection ingress STS-1 signals from ingress network line P1 $703_3$ replace those from ingress network line W1 $703_2$. In so doing, referring to FIGS. 5 and 7, it may be said that the egress line channel $712_1$ (and in particular the line level selection unit 501) deviates from the "normal operating" mode described above.

As a result of the deviation from the normal operating mode, the activity of continuously looking up (in a round robin fashion) only the entries from the normal operating table W CC Table_1 509a1, 709a1 will result in improper operation because it results in the selection of STS-1 signals from a "down" line during time slots 4, 5 and 6. That is, if only the normal operating table 509a1, 709a1 continues to be used, the STS-1 signals from the "down" working line W1 $703_2$ (i.e., STS1 signals: W1_STS1_1, W1_STS2_2, and W1_STS_3) will continue to be referenced.

Figure 8A:
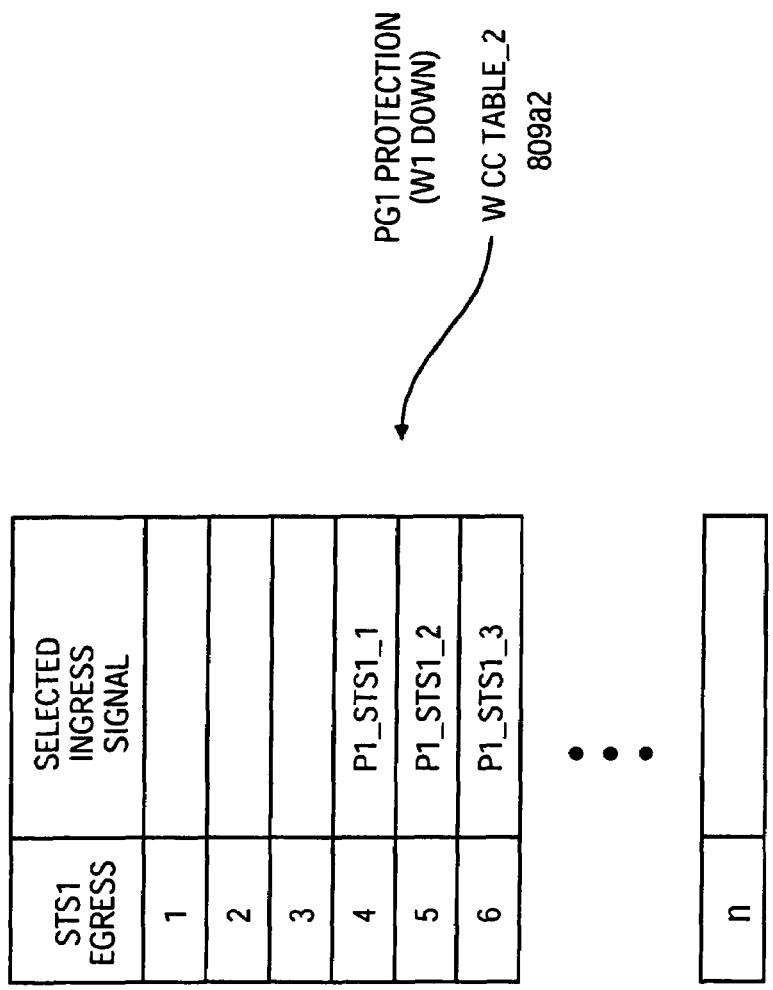
FIG. 8a shows a table that may be used to implement line level protection for according to a 1+1 protection scheme.

As such a second table may be used to replace or "patch" the defect described above in the normal operating table 509a1, 709a1. FIG. 8a shows an embodiment of such a table. The table of FIG. 8a, W CC Table_2 809a2 may be viewed as corresponding to the contents of table W CC Table_2 509a2 of FIG. 5. Referring then to FIGS. 5, 7 and 8a, if working line W1 goes "down", the line selection unit 501 may be viewed as operating in normal operating mode unless signals from the W1 ingress network line $703_2$ are to be selected from the backplane 505.

That is, for each egress clock 510 cycle that corresponds to a time slot other than time slots 4, 5 and 6, the output from the normal operating table 509a1, 709a1 is provided along the primary select line 512. However, for those egress clock 510 cycles that correspond to time slots 4, 5 and 6, the output from the W CC Table 2 509a2, 809a2 is provided along the primary select line 512. Looking at the entries within the W CC Table 2 809a2 embodiment of FIG. 8a, note that they properly reference the protection STS-1 signals (P1_STS1_1, P1_STS1_2, and P1_STS1_3) that are provided on ingress network line P1 $703_3$ of FIG. 7.

The ability to switch between the output of the normal operating table 509a1 (for egress clock cycles other than clock cycles 4, 5 and 6) and the output of the W CC Table 2 509a2 (for egress clock cycles 4, 5 and 6) in case the W1 ingress network line goes down, arises from the channel select value of the second multiplexer 504a. As observed in FIG. 5, the channel select value for the second multiplexer 504a is provided by the first multiplexer 507a.

As such, if working ingress line W1 fails (and all other working ingress lines remain "up"), the values provided at the first multiplexer 507a output will toggle between a first value that forces the selection of the normal operating table 509a1 output (for egress clock 510 cycles other than cycles 4, 5 and 6) and a second value that forces the selection of the W CC Table 2 509a2 output (for egress clock 510 cycles 4, 5 and 6).

In this manner, ingress signals from a protection line are used to replace those from a failed working line. A technique for properly modulating the value of the first multiplexer 507a output is described in more detail further below. Before discussing an embodiment of this operation, however, please refer to FIG. 8b which shows additional tables that may be used to recover from the failure of working line W2a $703_4$ and working line W2b $703_5$ (that are each shown in FIG. 7).

Consistent with the discussion above, W CC Table 3 809a3 of FIG. 8a may be viewed as corresponding to W CC Table 3 509a3 of FIG. 5 and W CC Table 4 809a4 of FIG. 8a may be viewed as corresponding to a following W CC Table 4 within the line selection unit 501 that is not drawn in FIG. 5 for simplicity (but would be drawn next to W CC Table 3 509a3 of FIG. 5 if it were otherwise). In accordance with this example, the W CC Table 3 509a3, 809a3 is employed if the W2a working ingress network line goes down and the W CC Table 4 809a4 is employed if the W2b working ingress network line goes down. The manner of replacement can be similar to that described above with respect to W CC Table 2 509a2, 809a2 described just above.

That is, if the W2a line goes down (and all other working lines remain "up"), the values provided at the first multiplexer 507a output will toggle between a first value that forces the selection of the normal operating table 509a1 output (for egress clock 510 cycles other than cycles 7 though 12) and a second value that forces the selection of the W CC Table 3 509a3 output (for egress clock 510 cycles 7 though 12). Note that clock cycles 7 through 12 employ the W CC Table 3 509a3.

In an alternative approach, only clock cycles 7 though 9 could have employed the W CC Table 3 509a3 because only clock cycles 7 through 9 correspond to ingress STS1 signals that travel on the downed working line W2a. As such, only the entries for the $7^{th}$, $8^{th}$ and $9^{th}$ clock cycles within W CC Table 3 809a3 of FIG. 8b reference an STS1 signal from the P2 protection line (which corresponds to the P2 ingress network line $703_6$ of FIG. 7).

Figure 8B:
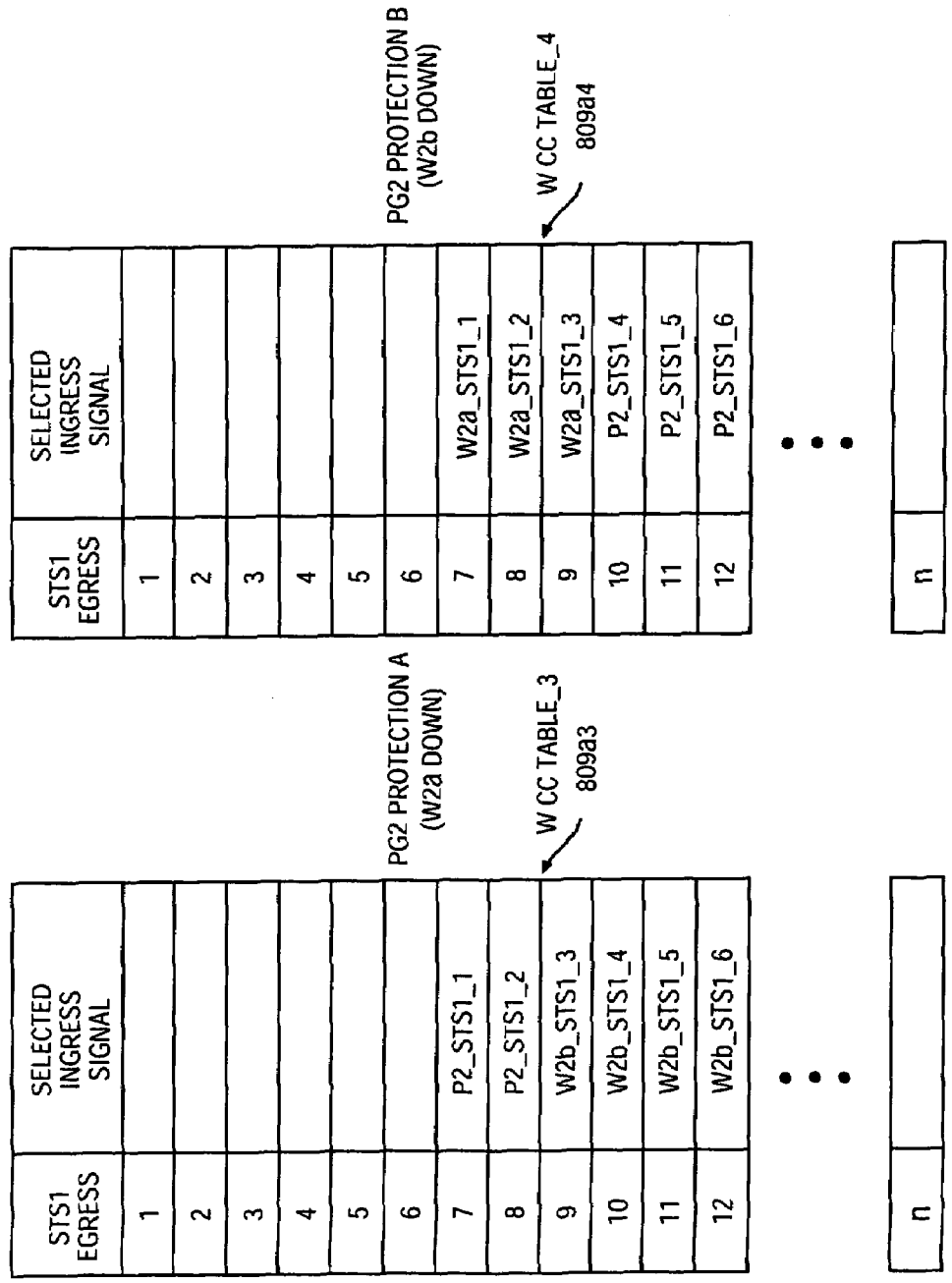
FIG. 8b shows a pair of tables that may be used to implement line level protection for according to a 1:n 1:n protection scheme.

Thus, as seen in within the W CC Table 3 809a3 of FIG. 8b, the entries for the $7^{th}$, $8^{th}$ and $9^{th}$ clock cycles are P2_STS1_1, P2_STS1_2 and P2_STS1_3. Nevertheless, it is perfectly suitable to arrange the tables as observed in FIG. 8b in which a failure within 1:n protection group causes working and protection (not just protection) STS1 signals to reference by the "patch" table that effectively corrects for the defect in the normal operating table 509a1. A corresponding table W CC Table 4 809a4 that is used if the W2b working line "goes down" is also provided in FIG. 8b. Note that, in this case, the $10^{th}$, $11^{th}$ and $12^{th}$ egress clock 510 cycles reference the P2 protection line.

Referring to FIG. 5, the immediately following discussion will detail an approach for controlling the first multiplexer 507a channel select value so that appropriate tables 509a1 through 509ax are employed over the course of each egress clock 510 cycle and over the course of certain events such as various working line failures, etc. In particular, an embodiment is presented of the contents of the primary protection group table 508a and the input values that may be provided to the first multiplexer 507a (PG0 STAT A, PG1 STAT A through PGY STAT A) in order to implement the nodal configuration discussed above with respect to FIGS. 7, 8a and 8b.

In particular, referring to FIG. 7, note that groups of network lines that have a protection relationship may be referred to as a "protection group." For example, a protection group may be viewed as the collection of working lines that are protected by a particular line (where the protection line is deemed to be included in the protection group). For example, recall from FIG. 7 that the W1 working line $703_2$ is protected (in a 1+1 fashion) by the P1 protection line $703_3$. As such, ingress networking lines $703_2$ and $703_3$ may be viewed as belonging to the same protection group (i.e., a first protection group (PG) labeled as "PG1" in FIG. 7).

Similarly, recall from FIG. 7 that the W2a and W2b working lines $703_4$, $703_5$ are both protected (in a 1:n fashion) by the P2 protection line $703_6$. As such, ingress networking lines 703₄, 703₅ and 703₆ may be viewed as belonging to a second protection group (i.e., a second protection group labeled as "PG2" in FIG. 7). Referring to FIGS. 5, 7 and 9a, note that the primary protection group table 908a of FIG. 9a may be viewed as an embodiment of the contents that may be stored within the primary protection group table 508a of FIG. 5.

Again, the left hand contents of the table 908a correspond to each egress slot clock 510 tick. The right hand column ("Applicable Protection Group") represents the applicable protection group that acts a source for the selected STS-1 signal for the specific egress clock 510 tick. For example, clock cycles 4, and 6 in the primary protection group table 908a reference the first protection group "PG1x". Recall that the 4th, 5th and 6th egress clock cycles are used for STS-1 signals from: 1) the W1 ingress line 703₂ (if it is "up") as described with respect to the normal operating table W CC Table_1 709a1 of FIG. 7; or 2) the P1 ingress line 703₃ (if the W1 ingress line is down) as described with respect to the W CC Table_2 embodiment 809a2 of FIG. 8a.

As such, the STS-1 signals associated with the 4$^{th}$, 5$^{th}$ and 6$^{th}$ egress clock 510 cycles may be viewed as being selected from the first protection group PG1, regardless if the working line W1 of the PG1 protection group is up or down. The primary protection group table 908a reflects this relationship and, as such, represents a listing of each protection group that acts as the source for the selected STS-1 signal for each egress slot clock 510 "tick". Thus, in a similar fashion, the primary protection group table 908a embodiment of FIG. 9a lists "PG2" as the source of the STS-1 signals that are selected during clock cycles 7 through 12.

Again, this is consistent with the operation of the line level selection unit 501 as discussed above with respect to the normal operating table W CC Table_1 709a1 embodiment of FIG. 7 and the W CC Table_2 809a2 and W CC Table_3 809a3 table embodiments of FIG. 8b. As such, for each egress slot clock 510 tick, an applicable protection group value is looked up from the primary PG table 508a and provided to the first multiplexer 507a. That is, the output of the primary PG table 508a corresponds to the particular protection group that acts as the source for the STS-1 signal to be selected from the backplane 505 for the present clock cycle.

The first multiplexer 507a is configured with a different input for each protection group handled by the line selection unit 501. That is, the first multiplexer has: 1) a PG0 STAT A input which corresponds to the unprotected W0 working line 703₁ of FIG. 7 (the operation of which is described toward the end of this discussion); 2) a PG1 STAT A input which corresponds to the first protection group PG1; 3) a PG2 STAT A input which corresponds to the second protection group PG2, etc. The application of the primary protection group table 508a output to the channel select of the first multiplexer 507a effectively enables the corresponding first multiplexer 507a input as the channel select value for the second multiplexer 504a channel select value.

That is, referring to FIGS. 5 and 9a: 1) a primary protection group table 908a output value of PG0 (e.g., as observed in FIG. 9a for the first three clock cycles) will provide the PG0 STAT A value at the channel select for the second multiplexer 504a; 2) a primary protection group table 908a output value of PG1 (e.g., as observed in FIG. 9a for the 4$^{th}$, 5$^{th}$ and 6$^{th}$ clock cycles) will provide the PG1 STAT A value at the channel select for the second multiplexer 504a; and 3) a primary protection group table 908a output value of PG2 (e.g., as observed in FIG. 9a for the 7$^{th}$ through 12$^{th}$ clock cycles) will provide the PG2 STAT A value at the channel select for the second multiplexer 504a; etc.

Therefore, by correlating the status of the working ingress lines within a protection group to the value of the STAT A parameter for that protection group, the proper W CC Tables can be selected for each STS 1 signal selected by the line level selection unit 501 (e.g., by selecting an STS1 signal from the normal operating table W CC Table 1 509a1 if all the working lines within a protection group are up; or, alternatively, selecting from another table that acts to "patch" a defect in the normal operating table because a working line has gone down). As such, the STAT A values effectively control which W CC Tables are employed. FIG. 9b demonstrates an embodiment of these correlations between the status of the working lines and the various STAT A values.

Note that in the embodiment of FIG. 9b that: 1) a STAT A value of "1" means that the table to be selected from corresponds to the normal operating table W CC Table_1 509a1, 709a1; 2) a STAT A value of "2" means that the table to be selected from corresponds to W CC Table_2 509a2, 809a2; 3) a STAT A value of "3" means that the table to be selected from corresponds to W CC Table_3 509a3, 809a3; and 4) a STAT A value of "4" means that the table to be selected from corresponds to W CC Table_4 809a4. As such, as observed in the correlation of FIG. 9b, starting with the first row of listings in FIG. 9b:

1) if all of the working lines are "up" (W0, W1, W2a, W2b "up") the normal operating 509a1, 709a1 is used for all of the STS-1 signals (within the first twelve clock cycles)—this corresponds to the normal operating mode for these clock cycles;
2) if only working line W1 goes down (W1 "down"), W CC Table_2 509a2, 809a2 is employed for the 4$^{th}$, 5$^{th}$ and 6$^{th}$ clock cycles—otherwise the normal operating table 509a1, 709a1 is employed;
3) if only the W2a working line goes down (W2a "down"), W CC Table_3 509a3, 809a3 is employed for the 7$^{th}$ through 12$^{th}$ clock cycles—otherwise the normal operating table 509a1, 709a1 is employed;
4) if only the W1 and W2a working lines go down (W1 "down", W2a "down"), the W CC Table_2 509a2, 809a2 is employed for the 4$^{th}$ through 6$^{th}$ clock cycles and W CC Table_3 509a3, 809a3 is employed for the 7$^{th}$ through 12$^{th}$ clock cycles—otherwise the normal operating table 509a1, 709a1 is employed;
5) if only the W1 and W2b working lines go down (W1 "down", W2b "down"), the W CC Table_2 509a2, 809a2 is employed for the 4$^{th}$ through 6$^{th}$ clock cycles and the W CC Table_4 809a4 is employed for the 7$^{th}$ through 12$^{th}$ clock cycles—otherwise the normal operating table 509a1, 709a1 is employed;
6) if only the W1, W2a and W2b working lines go down (W1 "down", W2a "down", W2b "down"), the W CC Table_2 509a2, 809a2 is employed for the 4$^{th}$ through 6$^{th}$ clock cycles and the W CC Table_3 509a3, 809a3 is employed for the 7$^{th}$ through 12$^{th}$ clock cycles—otherwise the normal operating table 509a1, 709a1 is employed;
7) if only the W2a and W2b working lines go down (W2a "down", W2b "down"), W CC Table_3 509a3, 809a3 is employed for the 7$^{th}$ through 12$^{th}$ clock cycles—otherwise the normal operating table 509a1, 709a1 is employed.

With respect to the last two row entries of FIG. 9b, note that a form of priority of has been implemented with respect to the second protection group "PG2" of FIG. 7. That is, if both the W2a and W2b ingress lines 703₄, 703₅ fail, the protection line P2 703₆ is configured to protect W2a and not W2b. As such, STS-1 signals will be selected for clock cycles 7, 8 and 9 but clock cycles 10, 11 and 12 will be "empty" (which may result in their corresponding time slots being filled with squelch traffic (e.g., "dummy traffic") by the framing and line interface unit 403 of FIG. 4 or some other ingress or egress channel function).

Another possibility of empty clock cycles arises with respect to the unprotected W0 ingress line $703_1$. That is, as the unprotected W0 ingress line $703_1$ does not have protection at the line level, there will be no STS-1 signals to select from the backplane 505 (for line level protection) if the W0 working line goes down. Note that the unprotected working line W0 is still assigned a "protection group" value (PG0) which correlates to a "frozen" PG0 STAT A value of "1". That is, the PG0 STAT A has no backup table to refer to for protection—so it only needs to have one state ("1") which refers to the normal operating table 509a1, 709a1.

Figure 9C:
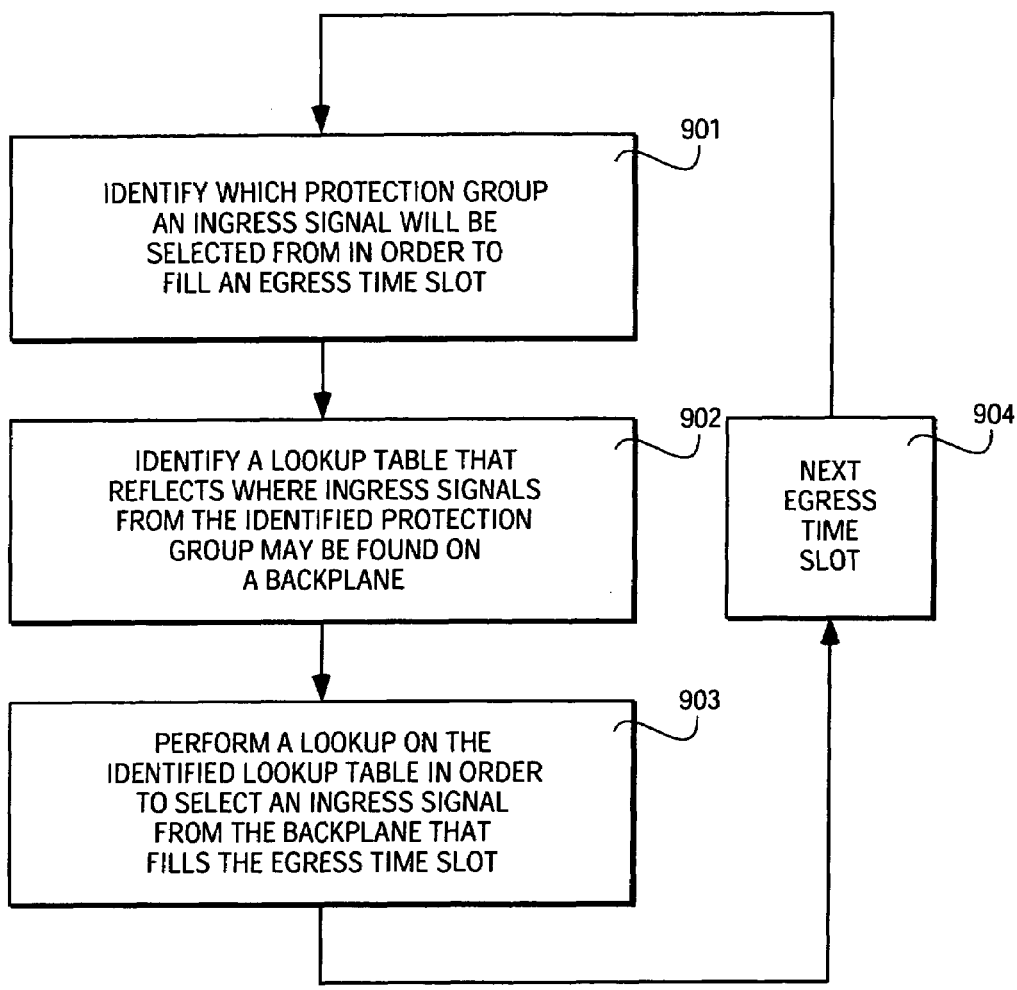
FIG. 9c shows a methodology that may be executed by the line level selection unit of FIG. 5.

FIG. 9c depicts an overview of the methodology discussed above. Referring to FIGS. 5, 9a and 9c, the lookup within the primary protection group table 508a, 908a described above is just one approach that may be used to identify which protection group an ingress STS-1 signal will be selected from in order to fill an egress time slot 901 (i.e., identifying the applicable protection group). That is, to first order, each egress time slot may be correlated to the protection group that will supply the egress time slot with an ingress signal. Table 908a may be viewed as an embodiment of such a correlation.

Referring to FIGS. 5, 7, 8a, 8b, and 9c, note that the transaction through the first multiplexer 507a (e.g., providing a particular PGx_STAT_A value in response to the applicable protection group) corresponds to just one approach that may be used to identify a lookup table that reflects where ingress signals from the identified protection group may be found on a backplane 902. As discussed above, tables 709a1, 809a2, 809a3 and 809a4 each indicate where ingress signals that belong to their protection group may be found on the backplane (based upon a particular status of the protection group).

The specific table to be used for a protection group may change if the status of the protection group changes (e.g., a working line goes down causing a protection line to carry its traffic). Note that the first multiplexer 507a could be replaced by another lookup table that is updated in light of changes to the state of a protection group. That is the lookup input would correspond to the applicable protection group and the lookup output would be the PGx_STAT_A value for the applicable protection group.

Lastly, once the lookup table to be used for the protection group is identified, a lookup is performed on the identified lookup table in order to select an ingress signal from the backplane that fills the egress time slot. This corresponds to a lookup made on any of the W CC Tables 509a1 through 509aX in FIG. 5. The process is then repeated for the next egress time slot.

3.0 Path Level Protection

Recalling the overview provided at the onset of this detailed description and the discussion of line level protection provided just above, note that a technique for generating the primary traffic stream 407 of FIG. 4 has just been thoroughly discussed above. That is, referring to FIGS. 4 and 5, the discussion of line level protection as implemented through the manipulation of the first and second multiplexers 507a, 504a (which controls the STS-1 signal references made along the primary select line 512) corresponds to the generation of a primary traffic stream 407 (which appears at the primary output 525) that should be "unaffected" if one or more working STS-1 signals, that are protected at the line level, go down.

Before initiating a detailed discussion of a technique for path level protection, referring to FIG. 4, recall that the primary traffic stream 407 flows into the path level selection unit 402. In the most basic case, path level protection is not provided for any of the STS-1 signals within the primary traffic stream 407. As such, no traffic appears on the secondary line 426; and, the primary traffic stream 407 on the primary line 425 is simply "repeated" by the path level selection unit 402 as the egress traffic 409 on the egress traffic line 410.

FIG. 6 shows an embodiment 602 of a design that may be used for the path level selection unit 402 of FIG. 4. In the embodiment of FIG. 6, the stream of primary traffic is received at the primary traffic input 625 and a stream of secondary traffic is received at the secondary input 626. The stream of primary traffic corresponds to stream 407 of FIG. 4 and the stream of secondary traffic (if any exists) corresponds to stream 408 of FIG. 4.

An egress slot clock 610 (which may be the same egress slot clock 510 as seen in FIG. 5) times the selection process of the STS-1 signals provided to the path level selection unit 602. That is, as discussed above, each clock tick of the egress slot clock 610 corresponds to a next time slot in the stream of egress traffic that flows on egress line 610. Note that this stream of egress traffic corresponds to stream 409 of FIG. 4.

The egress slot clock 610 feeds a counter 611 (having a modulo n) which, in turn, controls the channel select of a first multiplexer 604. The activity of the counter provides, in a round robin fashion, each of the multiplexer 604 STS1_Select_x inputs to the multiplexer 604 output. That is, a first egress slot clock 610 tick will provide STS1_Select_1 at the multiplexer 604 output, a second egress slot clock 610 tick will provide STS1_Select_2 at the multiplexer 604 output, a third egress slot clock 610 tick will provide STS1_Select_3 at the multiplexer 604 output, etc.

In an embodiment, each STS1_Select_x signal may have one of three values that determines whether the content of an egress traffic time slot corresponds to a primary STS1 signal, a secondary STS1 signal or squelch traffic (which is substantively empty or "dummy" traffic). A first value corresponds to the selection of the primary STS-1 signal that is located on the primary input 625 for the present egress clock cycle. A second value corresponds to the selection of the secondary STS-1 signal (if one exists) that is located on the secondary input 626 for the present egress clock cycle. A third value corresponds to the submission of squelch traffic (i.e., for the present egress clock cycle).

The design approach of FIG. 6 therefore allows for easy implementation of the egress traffic as primary STS1 signals, secondary STS1 signals or a combination of both. For example, recall the most basic case alluded to above where path level protection is not provided for any of the STS-1 signals within the primary traffic stream. As such, no traffic appears on the secondary line 626; and, the primary traffic stream on the primary input 625 is simply "repeated" by the path level selection unit 602 as the egress traffic on the egress traffic line 609.

In order to implement this configuration, each of the STS1_Select_x values are set to the same value; wherein, the value corresponds to the selection the first input 605 of the second multiplexer 603. As a result, the egress traffic on the egress line 610 will mirror the primary traffic on the primary input 625. Thus, such a configuration may be employed if only line level protection exists (or no protection at all) for the STS-1 signals being presented on the primary input 625.

Figure 10A:
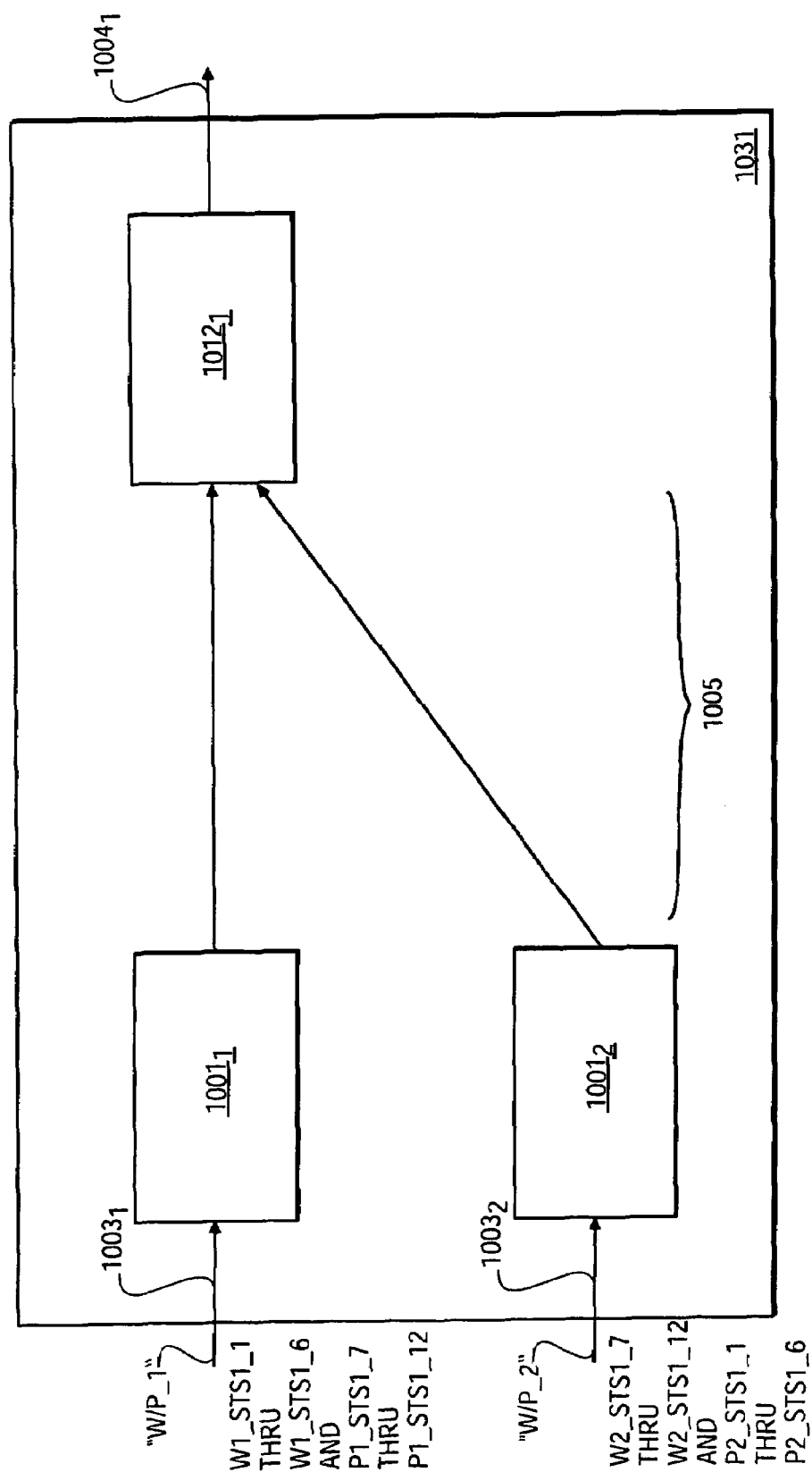
FIG. 10a shows an exemplary embodiment of a configuration for a node that receives information having path level protection.

FIG. 10a will be used to demonstrate an embodiment of how path level protection may be implemented. Specifically, FIG. 10a shows an embodiment of a node 1031 having at least a pair of ingress channels $1001_1$, $1001_2$ that each have a corresponding ingress network line "W/P1" $1003_1$, and "W/P2" 1003₂. In the example of FIG. 10*a*, twelve STS1 signals are emitted from the egress channel 1012₁ (as egress STS1 signals on the egress networking line 1004₁) that were originally received as ingress STS-1 signals on either ingress line W/P1 1003₁ or W/P2 1003₂.

According to the path level protection scheme of FIG. 10*a*, working and protection STS-1 signals are cross referenced on the pair of ingress lines W/P1 1003₁ and W/P2 1003₂. That is, the first six STS1 signals (of the twelve mentioned above) are received as working signals on the W/P1 1003₁ line and may be referred to as W1_STS1_1 through W1_STS1_6. Their corresponding protection signals are received on the W/P2 line 1003₂ and may be referred to as P1_STS1_1 through P1_STS1_6. The seventh through twelfth STS1 signals (of the twelve mentioned above) are received as working signals on the W/P2 1003₂ line and may be referred to as W2_STS1_7 through W1_STS1_12. Their corresponding protection signals are received on the W/P1 line 1003₁ and may be referred to as P1_STS1_7 through P1_STS1_12.

As such, twelve working STS1 signals (W1_STS1_1 through W1_STS1_6 and W2_STS1_7 through W2_STS1_12) and twelve corresponding protection STS1 signals (P2_STS1_1 through P2_STS1_6 and P2_STS1_7 through P2_STS1_12) are sent over the backplane 1005 to egress channel 1012₁. With respect to the example described just above, FIG. 11*a* corresponds to an embodiment 1109*a*1 of the contents within the normal operating working table W CC Table_1 509*a*1 of FIG. 5; and, FIG. 11*b* corresponds to an embodiment 1109*b*1 of the contents within the normal operating protection table P CC Table_1 509*b* of FIG. 5.

In accordance with the detailed discussion provided above with respect to the operation of the line level selection unit 501 of FIG. 5, it is clear that the table contents of FIGS. 11*a* and 11*b* will produce a stream of backplane references for the working STS1 signals on the primary select line 512; and, a stream of backplane references for the protection STS1 signals on the secondary select line 511. As a result, the working STS1 signals will appear on the primary line 525 and the protection STS1 signals will appear on the secondary line 526.

FIG. 12 shows various configurations for the path level selection unit 602 embodiment of FIG. 6 in response to various STS1 signal conditions associated with exemplary configuration of FIG. 10*a* and FIGS. 11*a* and 11*b*. That is, FIG. 12 demonstrates a few examples of the STS1_Select_x input settings for the first multiplexer 604. For example, the first row of settings (all working paths "up"), corresponds to a situation where all working STS1 signals are being received properly. In this case, there is no need to use any of the protection signals being received on the secondary input 626; and, the egress line 609 may be configured to repeat all of the traffic being received on the primary input 625.

As such, as observed in FIG. 12, all of the STS1_Select_x input values have a value of "W" which enables the first input 605 of the second multiplexer 603. The second row of settings (W1_STS1_1 "down"), correspond to a situation where all working STS1 signals are being received properly—except for the first working STS1 signal. In this case, there is a need to use the first protection STS1 signal being received on the secondary input 626.

As such, as observed in FIG. 12, all of the STS1_Select_x input values have a value of "W" (which enables the first input 605 of the second multiplexer 603) except the STS1_Select_1 input value. The STS1_Select_1 input has a value of "P" so that the first STS1 signal on the secondary input 626 is presented on the egress line 609. The remaining STS1 signals are still being selected from the primary input 625.

The third row of settings (W1_STS1_5 "down" and W1_STS1_11 "down"), correspond to a situation where all working STS1 signals are being received properly—except for the fifth and eleventh working STS1 signals. In this case, there is a need to use the fifth and eleventh protection STS1 signals being received on the secondary input 626. As such, as observed in FIG. 12, all of the STS1_Select_x input values have a value of "W" (which enables the first input 605 of the second multiplexer 603) except the STS1_Select_5 and STS1_Select_11 inputs. The STS1_Select_5 and the STS1_Select_11 inputs have a value of "P" so that the fifth and eleventh STS1 signals on the secondary input 626 are presented on the egress line 609. The remaining STS1 signals are still being selected from the primary input 625.

To review then, note the distinction between path level protection and line level protection. Line level protection can be used to support the loss of an entire line whereas path level protection can be used to support the loss of a single STS1 signal. As an example, referring to the examples discussed above with respect to FIGS. 7 and 10, note that line level protection applied when an ingress line (e.g., working line W1 703₂) to the node 731 of FIG. 7 went down. By contrast, path level protection applied when a single ingress STS1 signal (e.g., working ingress signal W1_STS1_1) to the node 1031 of FIG. 10*a* went down.

As such, as just one possible application, line level protection may be used to recover from the failure of a line that is coupled to the node whereas path level protection may be used to recover from the failure of a line (or system) that is not coupled to the node. That is, if a line coupled to the node goes down, the node tries to recover from the loss all of the STS1 signals on the line. However, if s distant or remote network line (i.e., that is not coupled to the node) goes down, the node only tries to recover of the loss of the STS1 signals on that line that flow through the node.

Note that the two types of protection may be mixed together. That is, a working STS-1 signal that appears on the primary line 425 of FIG. 4 may receive both line level protection (e.g., as described above with respect to FIGS. 7 through 9*b*) and path level protection (e.g., as described above with respect to FIGS. 10 through 11*b*). For example, the line level embodiment discussed above with respect to FIGS. 7 through 9*b* may be further modified to include path level protection for some (or all) of the working ingress STS1 signals received on working lines W0 703₁, W1 703₂, W2*a* 703₄ and W2*b* 703₅. The working ingress STS1 signals that receive path level protection can have their corresponding, path level protection ingress STS1 signals received anywhere by the node (e.g., at other ingress channels and network lines that are not shown in FIG. 7).

Referring to FIG. 5, these path level protection ingress STS1 signals may be referenced within the normal operating protection table P CC Table 1 509*b*1 so that they are passed forward along the secondary output 526. As such, line level protected STS1 signals will be presented on the primary output 525 (as discussed in the example provided by FIGS. 7 through 11*b*) and path level protection signals will be presented on the secondary output 526.

Figure 10B:
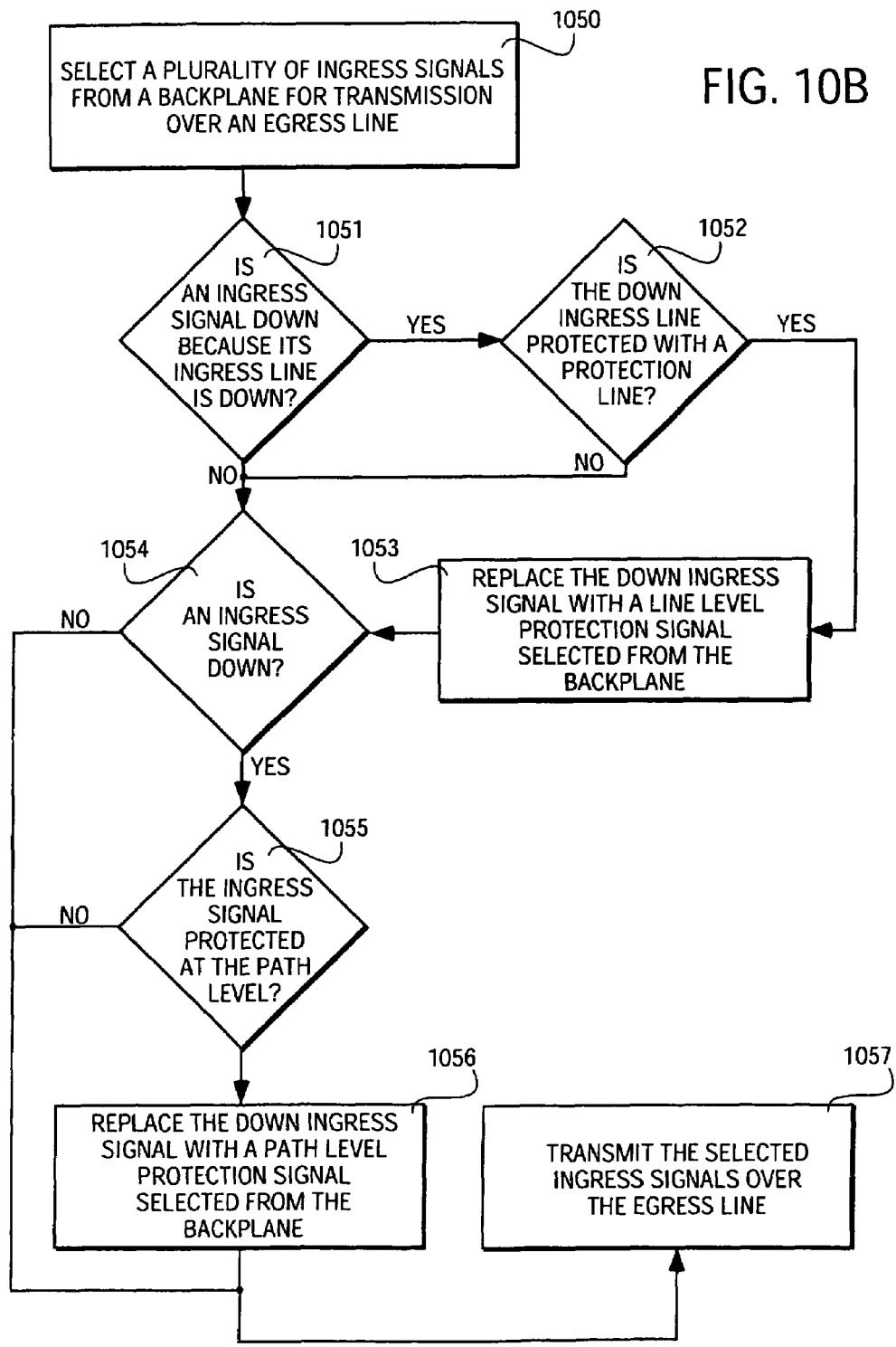
FIG. 10b shows a first methodology that may be executed by the egress channel architecture of FIG. 4.
Figure 10C:
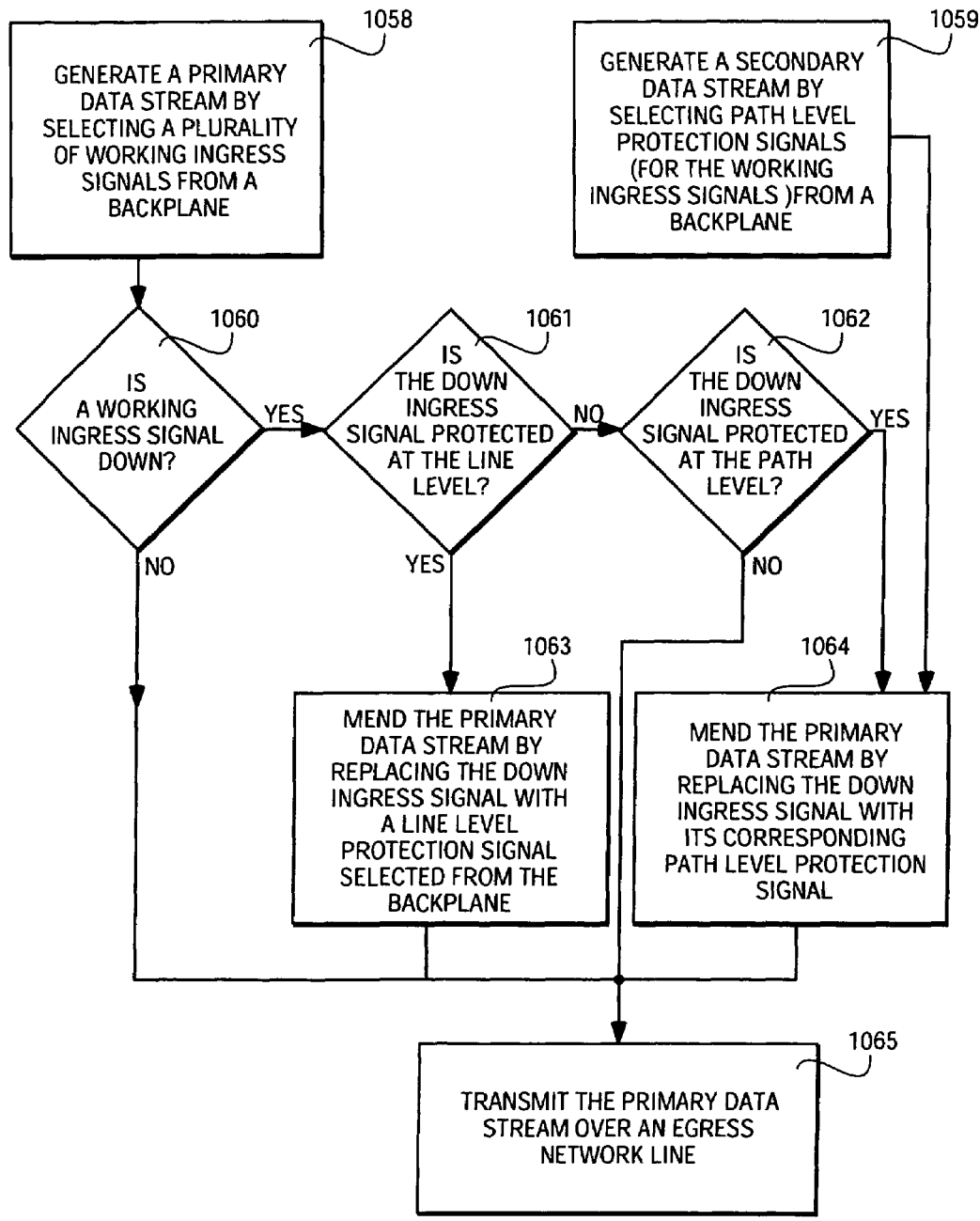
FIG. 10c shows a second methodology that may be executed by the egress channel architecture of FIG. 4.

FIGS. 10*b* and 10*c* outline methodologies, at a high level, that may be executed by the egress channel 412 of FIG. 4 that has been thoroughly described above. Referring to FIG. 10*a*, a plurality of ingress signals are selected 1050 from a backplane for transmission over an egress line. If an ingress signal goes down because it ingress line went down 1051 and if the down ingress line is protected 1052 with a protection line, the down ingress signal is replaced 1053 with a line level protection signal that is also selected from the backplane. This methodology can be mostly viewed as being performed by the line level selection unit 401 of FIG. 4.

If an ingress signal is still down 1054 and if the ingress signal is protected at the path level 1055, the down ingress signal is replaced 1056 with a path level protection signal that is also selected from the backplane. This methodology, in part, can be mostly viewed as being performed by the path level selection unit 402 of FIG. 4. The plurality of selected ingress signals, along with any replacement signals that have been applied, are then transmitted 1057 over the egress line.

FIG. 10c shows that a primary data stream may be generated by selecting 1058 a plurality of working ingress signals from a backplane; and a secondary data stream may be generated by selecting 1059 path level protection signals (for the selected working ingress signals described just above) from a backplane. If a working ingress signal goes down 1060 and if the down ingress signal is protected at the line level 1061, the primary data stream is effectively mended by replacing 1063 the down ingress signal with a line level protection signal that is also selected from the backplane.

If the down ingress signal is not protected at the line level 1061 but is protected at the line level 1062, the primary data stream is effectively mended by replacing 1064 the down ingress signal with a path level protection signal that: 1) corresponds to the down ingress signal; and, 2) is provided by the secondary data stream. The primary data stream, including any "mends" as described just above, is then transmitted over an egress network line 665.

In light of these methodologies, note that a line level protection signal corresponds to a signal received on a protection line that provides line level protection, a path level protection signal is a signal received by a system that protects (at the path level) another signal received by the node, and a working ingress signal is a signal received on an unprotected ingress line or a working ingress line that is protected at the line level. A working ingress signal may also correspond to a signal that is path protected by another ingress signal to the system.

4.0 Generation of Protected Signals

Up to now, the discussion has focused upon line level protection and path level protection for ingress STS1 signals that have been received with line level and/or path level protection. That is, no mention has been made as to how the ingress network lines to the node were configured, on their transmission side, so as to establish these protection schemes. The following discussion addresses how the egress channel architecture 412 of FIG. 4 may be used to transmit line level and path level protected signals.

Figure 13:
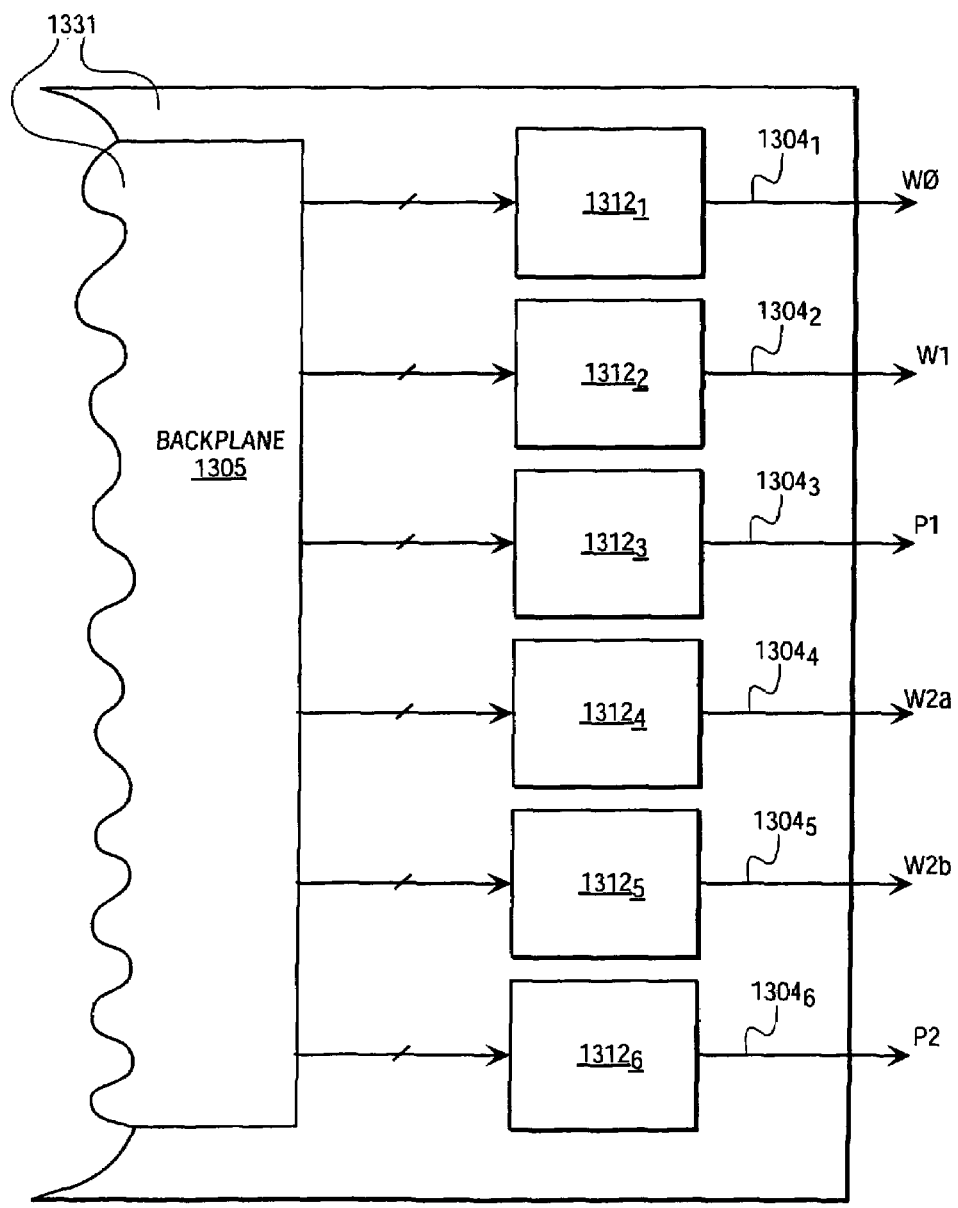
FIG. 13 shows an exemplary embodiment of a configuration for a node that transmits information having line level protection.

FIG. 13 shows an exemplary embodiment of the "egress half" of a node 1331 that transmits information having line level protection. For convenience, note that the nodal configuration of FIG. 13 corresponds to a networking system that could be transmitting to the networking system 731 of FIG. 7. That is, positioning FIG. 13 to the left of FIG. 7: 1) egress channel $1312_1$ of FIG. 13 communicates across networking line W0 $1304_1$, $703_1$ to ingress channel $701_1$ of FIG. 7; 2) egress channel $1312_2$ of FIG. 13 communicates across networking line W1 $1304_2$, $703_2$ to ingress channel $701_2$ of FIG. 7; 3) egress channel $1312_3$ of FIG. 13 communicates across networking line P1 $1304_3$, $703_3$ to ingress channel $701_3$ of FIG. 7; 4) egress channel $1312_4$ of FIG. 13 communicates across networking line W2a $1304_4$, $703_4$ to ingress channel $701_4$ of FIG. 7; 5) egress channel $1312_5$ of FIG. 13 communicates across networking line W2b $1304_5$, $703_5$ to ingress channel $701_5$ of FIG. 7; and 6) egress channel $1312_6$ of FIG. 13 communicates across networking line P2 $1304_6$, $703_6$ to ingress channel $701_6$ of FIG. 7.

Referring to FIG. 13, the unprotected W0 networking line $1304_1$ does not have protection and so a discussion of its protection signaling does not apply. Note, however, that the line level selection unit within egress channel $1312_1$ (e.g., line level selection unit 401 of FIG. 4) can be used to implement the portion of the switching fabric of node 1331 that applies to egress channel $1312_1$. That is, the line level selection unit of egress channel $1312_1$ can select the appropriate ingress STS1 signals from the backplane 1305 that are to be transmitted over networking line $1304_1$.

Before discussing the 1+1 protection of the W1 working line $1304_2$ (that is offered by the P1 protection line $1304_3$) and the 1:n protection of the W2a and W2b working lines $1304_4$, $1304_5$ (that is offered by the P2 protection line $1304_6$) note that path level protection can be offered in a manner similar to that described above. That is, path level protection can be offered simply by configuring a line to transmit each individual STS-1 signal that has "path level" protection status. Alternatively, STS-1 signals having "path level" protection status can be dispersed over a number of separate lines (e.g., to fill up time slots that would be unused otherwise).

For the W1 working line $1304_2$, the line level selection unit of egress channel $1312_2$ can be configured to select the appropriate ingress STS1 signals from the backplane 1305 that are to be transmitted over networking line $1304_2$. Furthermore, recalling that the P1 protection line $1304_3$ corresponds to a 1+1 protection line for the W1 working line $1304_2$, egress channel $1312_3$ can be configured to generate a 1+1 protection line P1 by maintaining an identical configuration as that maintained by egress channel $1312_2$. That is, referring briefly back to FIG. 5, if egress channel $1312_2$ and egress channel $1313_3$ maintain identical copies of the primary protection group table 509a, STAT A values and W CC Tables 1 509a1 through X 509ax, protection line P1 $1304_3$ will have an identical information flow as the W1 working line $1304_2$.

FIGS. 14a through 14d and FIG. 15 relate to the configuration of the egress channel $1312_6$ that supports the P2 1:n protection line for working lines W2a $1304_4$ and W2b $1304_5$. Specifically, referring to FIG. 5 and FIGS. 14a through 14d, note that each of the figures associated with FIG. 14 provide a different W CC Table. That is: FIG. 14a corresponds to an embodiment 1409a1 of the contents for the W CC Table_1 509a1 of FIG. 5; FIG. 14b corresponds to an embodiment 1409a2 of the contents for the W CC Table_2 509a2 of FIG. 5; FIG. 14c corresponds to an embodiment 1409a3 of the contents for the W CC Table_3 509a3 of FIG. 5; and FIG. 14d corresponds to an embodiment 1409a1 of the contents for the W CC Table_4 (which is not drawn in FIG. 5).

The tables of FIG. 14a through 14d are configured according to a perspective that each STS1 signal being transmitted on the working lines W2a and W2b have two sources. For example, the first STS1 signal transmitted on the W2a working line $1304_4$ may be viewed as being received from a working source (e.g., a first ingress channel (not shown) within node 1331 of FIG. 13) and from a protection source (e.g., a second ingress channel (not shown) within node 1331 of FIG. 13). The backplane reference to this STS1 signal from the working source may be encrypted as W2a_STS1_W_1; and, the backplane reference to this STS1 signal from the protection source may be encrypted as W2a_STS1_P_1.

Note that the "working source" reference is listed within the first egress slot entry in table 1409a1 of FIG. 14a; and, the "protection source" reference is listed within the first egress slot entry in table 1409a2 of FIG. 14b. Looking at the organization of these two tables 1409a1 and 1409a2, it is apparent that table 1409a1 of FIG. 14a corresponds to a listing of the "working source" reference for each STS1 signal within the W2a working line $1304_4$; and, table 1409a2 of FIG. 14b corresponds to a listing of the "protection source" reference for each STS1 signal within the W2a working line $1304_4$.

Similarly, table 1409a3 of FIG. 14c corresponds to a listing of the "working source" reference for each STS1 signal within the W2b working line $1304_5$; and, table 1409a4 of FIG. 14d corresponds to a listing of the "protection source" reference for each STS1 signal within the W2b working line $1304_5$. Accordingly, in the simplest case, the working sources for all of the STS1 signals on both working lines W2a and W2b are "up" when one of the working lines fails.

As such, if the W2a working line $1304_4$ fails when all of its working source references are "up", Table 1409a1 of FIG. 14a is immediately enabled by the protection egress channel $1312_6$ of FIG. 13. For example, referring briefly back to FIG. 5, the second multiplexer 504a is configured to select the output of the W CC Table_1 table 509a1 as soon as possible after a failure of the W2a working line is detected. As a result, the STS1 signals previously being transmitted along the W2a working line $1304_4$ are effectively "switched over" so as to be sent over the P2 protection line $1304_6$. This operation is consistent with 1:n protection.

In a similar fashion, if the W2b working line $1304_5$ fails instead, Table 1409a3 of FIG. 14c is quickly enabled by the protection egress channel $1312_6$ of FIG. 13. As a result, the STS1 signals previously being transmitted along the W2b working line $1304_5$ are effectively "switched over" so as to be sent over the P2 protection line $1304_6$. This is, again, consistent with the operation of the P2 protection line $1304_6$ as a 1:n protection line for working lines W2a and W2b.

Figure 15:
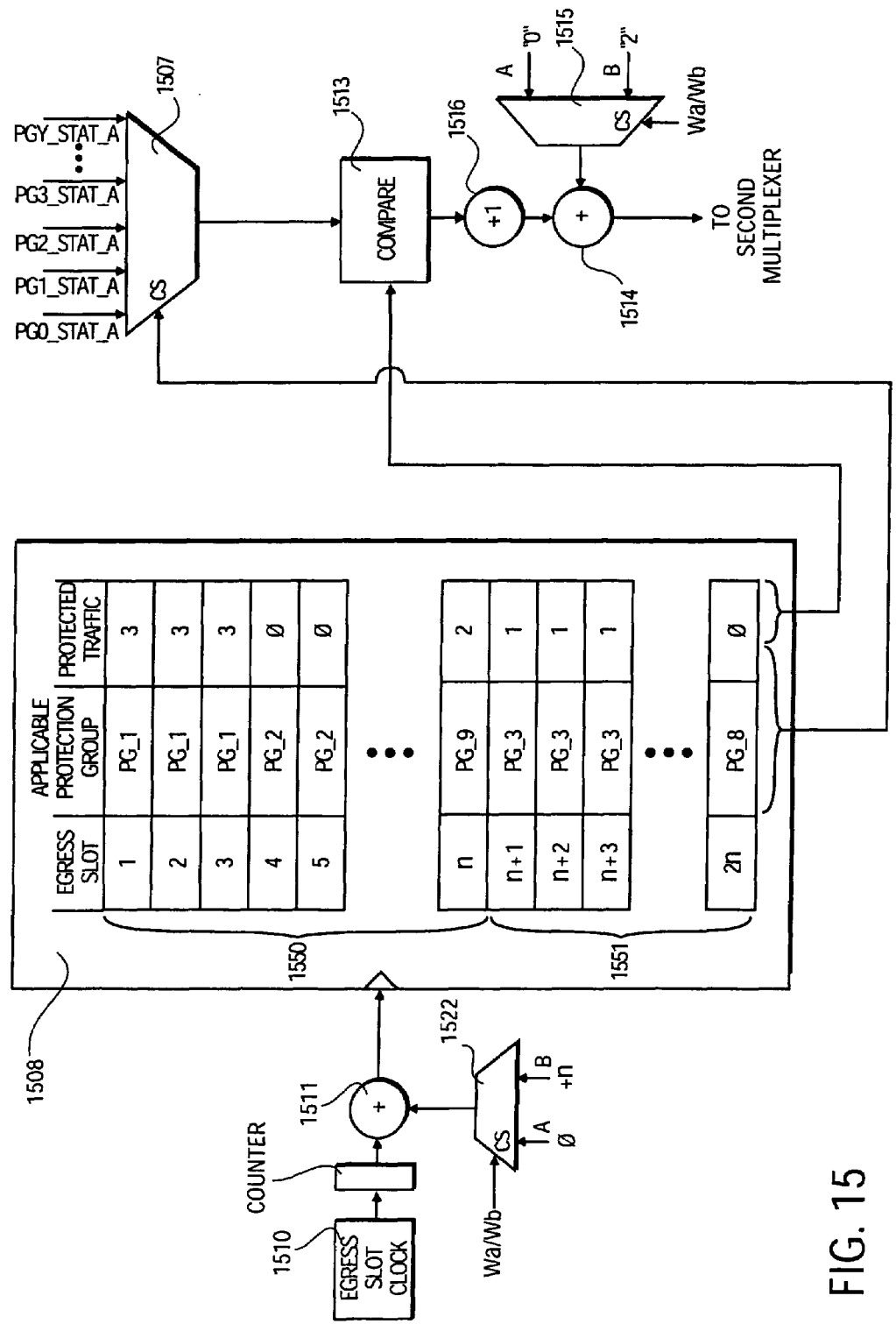
FIG. 15 shows an embodiment of a primary protection group table that may be employed in order to implement the 1:n protection scheme depicted in FIG. 13.

FIG. 15 shows an embodiment of a primary protection group table 1508 that may be used in cooperation with the 1:2 protection approach outlined in FIGS. 14a through 14d. In FIG. 15 the primary protection group table 1508 may be viewed as corresponding to the primary protection group table 508a of FIG. 5; and, within FIG. 15, the first multiplexer 1507 may be viewed as corresponding to the first multiplexer 507a of FIG. 5 as well. Note the approach of FIG. 15 includes slight modification to the approach of FIG. 5. For example, note the "third" multiplexer 1522 and summation unit 1511 between the egress slot clock 1510 and the primary protection group table 1508.

The "second" multiplexer is not shown in FIG. 15 but may be viewed as corresponding to the second multiplexer 504a of FIG. 5. As such, note that the output of the first mutliplexer 1507 flows to the second mutliplexer (beyond the comparison unit 1513 and second summation unit 1514). The comparison unit 1513, second summation unit 1514 and fourth multiplexer 1515 represent an additional modification to the design embodiment of FIG. 5. Accordingly, these modifications are discussed in more detail below.

The primary protection group table 1508 of FIG. 15 may be viewed as having two separate tables. A first table 1550 between egress slot references 1 to n; and, a second table 1551 between egress slot references n+1 and 2n. The first table 1550 may be viewed as a listing of the applicable protection group (similar to those described with respect to FIG. 9a) for each STS-1 signal sent over working egress line W2a $1304_4$ of FIG. 13; and, the second table 1551 may be viewed as a listing of the applicable protection group for each STS-1 signal sent over working egress line W2b $1304_5$ of FIG. 13. Note that these protection groups are those that reside on the ingress half of node 1331 (which is not shown in FIG. 13). As such, no depiction of these protection groups has been drawn.

Keeping in mind that the primary protection group embodiment 1508 of FIG. 15 applies to the protection egress channel $1312_6$ of FIG. 13, table 1550 will be "read from" if the W2a working line $1304_4$ goes down or; alternatively, table 1551 will be read from if the W2b working line $1304_5$ goes down. As a result, consistent with proper operation of a 1:2 protection line, protection egress line 13046 will transmit the signals originally sent by working line W2a if working line W2a goes down or the signals originally sent by working line W2b if working line W2b goes down.

The different tables are read from by modulating the egress slot clock 1510 count. That is, if the W2a working line goes down, the third multiplexer 1522 will enable its "A" input (which has the effect of adding a 0 to the egress slot clock 1510 count. As such, egress slot values between 1 and n will be looked up from the primary protection group table 1508 (which corresponds to the use of table 1550). If the W2b working line goes down, the third multiplexer 1522 will enable its "B" input (which has the effect of adding "n" to the egress slot clock 1510 count. As such, egress slot values between n+1 and 2n will be looked up from the primary protection group table 1508 (which corresponds to the use of table 1551). Note that counter counts between 1 and n.

Thus applicable protection group values, for whichever downed working line goes down, will be applied to the channel select input of the first multiplexer 1507. Accordingly, the inputs to the first mutliplexer will reflect the status of their corresponding protection group. Implicit in these values is whether or not an ingress signal is currently being received upon its working line or its protection line (recalling that these values change if a protection group has to "switchover" to its protection line).

The third column in the primary protection group table ("Protected Traffic Indicator") indicates, for each applicable protection group (e.g., PG0 for egress slots 1, 2 and 3 in table 1550), which STAT_A value would be present if the source for the desired ingress signal at each egress time slot was "switched over" from its working ingress line to its "protection" ingress line. That is, as described above, the PGx_STAT_A inputs to the first multiplexer 1507 indicate which W CC table should be used for each possible state of its corresponding protection group (as described with respect to FIG. 9c).

As such, its value is indicative as to whether or not an ingress signal is being received upon its working line or its protection line. According to the operation of the embodiment of FIG. 15, if the ingress signal is being received with its protection line, the Protected Traffic Indicator (within the protection group table 1508) will "match" the STAT_A value presented at the output of the first multiplexer 1507. For example, if the first STS-1 signal in table 1550 (at egress slot clock 1) is going to be received by node 1331 with its protection line (rather than its working line), the value of PG1_STAT_A will be a "3".

As such, a comparison of this STAT_A value with its Protection Traffic Indicator value will "match" (because a "3" is listed as the Protection Traffic Indicator value for the first ingress STS-1 signal in table 1550). Accordingly, a "match" at the output of the comparator 1513 is designed to trigger the use of the "protection" source W CC Table (which corresponds to W CC Table_2 1409a2 of FIG. 14b for this example). If a "match" does not exist at the comparator 1513 output, then the first STS-1 signal destined associated with the W2a working line is being received from its working source rather than its protection source. As such, a "match" at the output of the comparator 1513 is designed to trigger the use of the "working" source W CC Table (which corresponds to W CC Table_1 1409a1 of FIG. 14a for this example).

The logic flowing from the comparator 1513 allows for the proper W CC tables to be referenced in light of the STAT_A values and whether or not the W2a or W2b egress working lines have gone down. Specifically, the lack of a match at the comparator output will produce a "0" which is then incremented to a "1" by adder 1516. If the W2a working egress line is down, the "A" channel of the fourth multiplexer 1515 will be enabled which has no effect on the adder 1516 output (because only a "0" is added by summation unit 1514). As such, the second multiplexer (not shown) will receive a value of "1" which corresponds to the selection of W CC Table_1 1409a1 of FIG. 14a.

Correspondingly, if there is a "match" at the comparator 1513 output and the W2a egress working line is down, the adder 1516 output will be a "2" and the summation unit 1514 will be a "2". As such, the second multiplexer (not shown) will receive a value of "1" which corresponds to the selection of W CC Table_2 1409a2 of FIG. 14b. As such, for working line W2a, the working source is properly selected from if an STS-1 signal is still being received on its working source and the protection source is properly selected from if an STS-1 signal is being received from its protection source. If the W2b working line goes down, the fourth muliplxer 1515 will employ channel "B" which bumps up the adder 1516 output values to "3" or "4" (depending on whether or not a match exists) which corresponds to selection with W CC Table_3 1409a3 or W CC Table_4 1409a4 of FIGS. 14c and 14d.

5.0 Additional Notes

It is important to point out a few comments that follow immediately below. To first order, note that although the exemplary circuit diagrams and examples provided above have been limited to an STS-1 resolution level. That is, a basic signal that is handled or referenced is an STS-1 signal. In alternate embodiments, a basic signal that is handled or referenced may be a signal other than an STS-1 signal. For example, if SDH frames rather than SONET frames are employed, a basic signal may be an STM-1 signal rather than an STS-1 signal.

Furthermore, a basic signal may be resolved to a finer degree of resolution than an STS-1 or STM-1 signal (e.g., by individually recognizing fractional segments of STS-1 or STM-1 signals) to a signal having a slower data rate than an STS-1 or STM-1 signal. Further still, a basic signal may be resolved to a courser degree of resolution than an STS-1 or STM-1 signal (e.g., by individually recognizing groupings of STS-1 or STM-1 signals) to a signal having a higher data rate than an STS-1 or STM-1 signal.

Note also that the various tables shown (e.g., as in FIG. 5) may be implemented not only as separate memories or registers (with unique inputs and outputs) but also within in a common memory (such as the same memory region of a semiconductor chip or the same memory chip) or common register. For example, the individual tables 509a1 through 509aX observed in FIG. 5 may actually be implemented as different portions of the same memory. As such, the input and outputs of these different tables may correspond to different addresses rather than different electrical lines. Alternatively, the different inputs and outputs of these tables may correspond to different ports of the same memory. Note also that alternatives to the first and second multiplexers 507a, 504a may exist as well. For example, memory address generation logic may replace the first and second multiplexers 507a, 504a as well as other logic circuitry that performs the proper lookups from the tables.

Furthermore, note that actual detection of whether various network lines are "up" or "down", the updating of various tables entries (in response thereto or otherwise), and the setting of various input values or other parameters (such as the PGx_STAT_A variables of FIG. 5 and the STS1_Select_x variables of FIG. 6) may be performed or otherwise affected by configuration and/or maintenance software that runs on the networking system. The configuration and/or maintenance software may execute, be a part of, relate to, or otherwise cooperate with the APS protocol described in the background. The configuration and/or maintenance function may also be implemented, in varying degrees depending on the embodiment, in hardware rather than software.

Note also that embodiments of the present description may be implemented not only within a semiconductor chip or a plurality of semiconductor chips but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a) a line level selection unit to form a primary traffic stream and a secondary traffic stream, said primary traffic stream comprising a plurality of signals that are received on one or more working or protection ingress lines, said secondary traffic stream comprising the path level protection signal for each of those of said signals within said primary traffic stream having path level protection, said line level selection unit comprising multiplexing circuitry having inputs to receive said plurality of signals; and
b) a path level selection unit to receive said primary traffic stream and said secondary traffic stream, said path level selection unit having second multiplexing circuitry to form an egress traffic stream by replacing, with its corresponding path level protection signal, any of those of said signals within said primary traffic stream having path level protection that have failed.

2. The apparatus of claim 1 wherein said signals are STS signals.

3. The apparatus of claim 1 wherein said signals are SONET or SDH signals.

4. An apparatus, comprising:
   a) distributed mesh circuitry to propagate ingress signals to egress channels;
   b) first selection circuitry within an egress channel to:
      i) select working and/or protection signals from said ingress signals;
      ii) select path level protection signals from said ingress signals for those of said working and/or protection signals having path level protection;
   c) second selection circuitry within said egress channel to:
      i) provide said working and/or protection signals as an egress stream of signals when none of said working and/or protection signals have failed;
      ii) replace a failed signal within said working and/or protection signals with said failed signal's path level protection signal within said path level protection signals.

5. The apparatus of claim 4 wherein:
   said first selection circuitry comprises first multiplexing circuitry to perform b)(i) above and to perform b)(ii) above;
   said second selection circuitry comprises second multiplexing circuitry to perform c)(i) above and to perform c)(ii) above.

6. The apparatus of claim 5 wherein said signals are SONET or SDH signals.

7. The apparatus of claim 5 wherein:
   said first selection circuitry is coupled to storage resources to implement tables that store information that defines which signals amongst said ingress signals correspond to said working and/or protection signals and store information that defines which signals amongst said ingress signals correspond to said path level protection signals.

8. The apparatus of claim 7 wherein said storage resources include at least one of:
   memory storage resources;
   register storage resources.

9. The apparatus of claim 5 further comprising an egress slot clock to time selections of b)(i) and b)(ii) above.

10. The apparatus of claim 4 further comprising framing and line interface circuitry to receive said egress stream of signals.

11. A method, comprising:
    distributing ingress signals across a mesh to egress channels;
    selecting working and/or protection signals from said ingress signals;
    selecting path level protection signals from said ingress signals for those of said working and/or protection signals having path level protection;
    providing said working and/or protection signals as an egress stream of signals when none of said working and/or protection signals have failed; and,
    replacing within said egress stream of signals a failed signal within said working and/or protection signals with said failed signal's path level protection signal within said path level protection signals.

12. The method of claim 11 further comprising, in order to perform said selecting working and/or protection signals, referring to tables that store information that defines which signals amongst said ingress signals correspond to said working and/or protection signals and store information that defines which signals amongst said ingress signals correspond to said path level protection signals.

13. The method of claim 12 wherein said signals are STS signals.

14. The method of claim 12 wherein said signals are SONET or SDH signals.

15. The method of claim 12 wherein said tables are implemented with at least one of:
    memory storage resources;
    register storage resources.

16. The method of claim 11 wherein an egress slot clock times said selecting working and/or protection signals.

17. The method of claim 11 further comprising receiving said egress stream signals at framing and line interface circuitry.

18. The method of claim 11 wherein said signals are STS signals.

19. The method of claim 11 wherein said signals are SONET or SDH signals.

20. A networking system comprising:
    a) a distributed mesh backplane to propagate ingress signals to egress channels;
    b) an egress channel comprising:
       first selection circuitry to:
          i) select working and/or protection signals from said ingress signals;
          ii) select path level protection signals from said ingress signals for those of said working and/or protection signals having path level protection;
       and second selection circuitry to:
          i) provide said working and/or protection signals as an egress stream of signals when none of said working and/or protection signals have failed;
          ii) replace a failed signal within said working and/or protection signals with said failed signal's path level protection signal within said path level protection signals.

21. The networking system of claim 20 wherein:
    said first selection circuitry comprises first multiplexing circuitry to perform b)(i) above and to perform b)(ii) above;
    said second selection circuitry comprises second multiplexing circuitry to perform c)(i) above and to perform c)(ii) above.

* * * * *

UNITED STATES PATENT AND TRADEMARK OFFICE
CERTIFICATE OF CORRECTION

| | | |
|---|---|---|
| PATENT NO. | : 7,630,301 B2 | Page 1 of 1 |
| APPLICATION NO. | : 11/339246 | |
| DATED | : December 8, 2009 | |
| INVENTOR(S) | : Lund et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Second Day of November, 2010

David J. Kappos
*Director of the United States Patent and Trademark Office*